United States Patent [19]
Hester et al.

[11] Patent Number: 5,964,871
[45] Date of Patent: Oct. 12, 1999

[54] RESOLUTION OF RESOURCE CONFLICTS BY REDUCTION OF SYSTEMS TO SOLVE

[75] Inventors: Garyl L. Hester, Spring; Cindy R. McGee, Houston; John DeNardo, Spring; Kenneth W. Hester, Houston, all of Tex.

[73] Assignee: Compaq Computer Corporation, Houston, Tex.

[21] Appl. No.: 08/814,429

[22] Filed: Mar. 10, 1997

[51] Int. Cl.⁶ .................................................. G06F 13/00
[52] U.S. Cl. .................................................. 713/1; 710/8
[58] Field of Search .................................. 395/830, 842, 395/846, 500, 800; 710/8, 9; 713/1, 100

[56] References Cited

U.S. PATENT DOCUMENTS

| | | | |
|---|---|---|---|
| 5,257,387 | 10/1993 | Richek et al. | 395/800.01 |
| 5,263,148 | 11/1993 | Jones, Jr. et al. | 395/500 |
| 5,353,432 | 10/1994 | Richek et al. | 395/500 |
| 5,450,570 | 9/1995 | Richek et al. | 395/500 |
| 5,806,074 | 9/1998 | Sounder et al. | 707/201 |

OTHER PUBLICATIONS

"Plug and Play BIOS Specification," Compaq Computer Corp., Phoenix Technologies Ltd., Intel Corp., Version 1.0A (Mar. 5, 1994).
"Extended System Configuration Data Specification", Compaq Computer Corp., Intel Corp., and Phoenix Technologies, Ltd., Version 1.03 (Dec. 12, 1994).
"Clarifications to Plug and Play ISA Specification," Plug-Fests, Version 1.0a (Dec. 10, 1994).
"Plug and Play ISA Specification", Intel Corp. and Microsoft Corp., Version 1.0a (May 5, 1994).
"PCI Local Bus", PCI BIOS Specification, Revision 2.1d, PCI Special Interest Group (Mar. 9, 1994).
Van Name, Mark L. & Catchings, Bill, "Plug and Play: Still Less Than Half An Answer", PC Week (Feb. 10, 1997).

*Primary Examiner*—Hassan Kizou
*Assistant Examiner*—Abu Hossain
*Attorney, Agent, or Firm*—Akin, Gump, Strauss, Hauer & Feld, L.L.P.

[57] ABSTRACT

The present invention resolves conflicts in the computer system with one or more devices and one or more system resources and where each of the devices has an existing configuration and one or more acceptable configurations. The devices are represented as one or more objects corresponding to each of the devices. Each object has a move procedure and a fit procedure. The move procedure requests objects representative of other devices to move from their existing configurations, while the fit procedure attempts to fit an acceptable configuration of the object into the system resources. The objects are linked together using a tree structure. When a new or unconfigured device is to be added to the system, the apparatus provides a new or unconfigured object representative of the new or unconfigured device. The new or unconfigured object calls the fit procedure to attempt to fit itself into said system resources and, if a non-conflicting configuration is available from the acceptable configurations for the new or unconfigured device, to set the configuration of the new or unconfigured device to the non-conflicting configuration. Otherwise, the object communicates with the remaining objects to request remaining devices to select another configuration from their acceptable configurations until a non-conflicting configuration is available for said first device.

33 Claims, 26 Drawing Sheets initial state

|  | A | B | C |
|---|---|---|---|
| configured | Y | Y | N |
| in FitMe | N | N | N |
| in MoveMe | N | N | N |

740

1.) C → FitMe →↺

|  | A | B | C |
|---|---|---|---|
| configured | Y | Y | N |
| in FitMe | N | N | Y |
| in MoveMe | N | N | N |

742

1.) C → DoesResConflict → A ⟹ NO
2.) C → DoesResConflict → B ⟹ YES
(Assumption: C has only one configuration)

3.) C → FitMe(resolution mode) →↺
4.) C → DoesResConflict → A ⟹ NO
5.) C → DoesResConflict → B ⟹ YES
6.) C → MoveMe → B

744

|  | A | B | C |
|---|---|---|---|
| configured | Y | Y | N |
| in FitMe | N | N | Y |
| in MoveMe | N | Y | N |

(Assumption: B has second configuration possibility to try)
1.) B → DoesResConflict → A ⟹ YES(second cfg)
(Assumption: B has no more configuration possibilites)
2.) B → MoveMe → A

|  | A | B | C |
|---|---|---|---|
| configured | Y | Y | N |
| in FitMe | N | N | Y |
| in MoveMe | Y | Y | N |

746

(Assumption: A has a second configuration)
1.) A → DoesResConflict → B ⟹ NO
2.) A → DoesResConflict → C ⟹ NO
(return out of A's MoveMe)

|  | A | B | C |
|---|---|---|---|
| configured | Y | Y | N |
| in FitMe | N | N | Y |
| in MoveMe | N | Y | N |

748

(return out of B's MoveMe)

|  | A | B | C |
|---|---|---|---|
| configured | Y | Y | N |
| in FitMe | N | N | Y |
| in MoveMe | N | N | N |

750

(return out C's FitMe)

|  | A | B | C |
|---|---|---|---|
| configured | Y | Y | Y |
| in FitMe | N | N | N |
| in MoveMe | N | N | N |

| SCOREBOARD | | | | |
|---|---|---|---|---|
| | DMA 12 | DMA 14 | DMA 16 | DMA 18 |
| IRQ 1 | A | | | |
| IRQ 2 | | B | | |
| IRQ 3 | | | | |
| IRQ 4 | | | | |

RESOLUTION OF RESOURCE CONFLICTS BY REDUCTION OF SYSTEMS TO SOLVE

RELATED APPLICATIONS

This application is related to the following copending, concurrently filed, and commonly assigned U.S. patent applications which are hereby incorporated by reference:

U.S. patent application Ser. No. 08/814,260, now U.S. Pat. No. 5,884,075, entitled "Conflict Resolution Using Self-Contained 'Virtual' Devices," to Garyl L. Hester, Cindy R. McGee, John DeNardo, and Kenneth W. Hester;

U.S. patent application Ser. No. 08/815,394, entitled "Generation of a Device Configuration Through Pattern Matching," to Cindy R. McGee, Garyl L. Hester, John DeNardo, and Kenneth W. Hester; and U.S. patent application Ser. No. 08/814,439, entitled "Resource Type Prioritization in Generating a Device Configuration," to Cindy R. McGee, Garyl L. Hester, John DeNardo, and Kenneth W. Hester, Tami J. Gibbons, and Bradley J. Staff.

BACKGROUND OF THE INVENTION

1. Field of the Invention

The present invention relates to personal computers, and more particularly, to a system for resolving conflicts encountered during the setup of personal computer hardware.

2. Description of the Related Art

The growth of the personal computer industry is attributable in part to the availability of inexpensive, yet powerful, personal computers. Improvements in processor, memory, data storage capability, and communications technologies have resulted in computers which can provide sufficient processing capability for applications such as multimedia, three dimensional (3D) animation, and teleconferencing, among others. To ensure manufacturing efficiency, common components of a computer such as a processor and a memory system are provided on a motherboard. The motherboard further provides one or more expansion buses to enable the motherboard to be customized to the user's specific requirements. The use of interchangeable circuit boards has allowed lower cost, highly-flexible computer systems to be developed.

After obtaining the motherboard, the user adds the desired circuit boards having the desired memory and input/output features to complete the computer system. In this way, individualized computer system can be easily and efficiently developed. These circuit boards typically make complex demands on the computer system resources, particularly on the limited common computer resources such as interrupt request lines (IRQ lines), direct memory access (DMA) channels, and input/output and memory address space. Additionally, the circuit boards often require internal initialization or selection of internal options to meet the desired conditions. The configuration of a variety of circuit boards in the computer system leads to potential configuration conflicts and complex decisions to resolve such conflicts, particularly as the complexity of the circuit board increases or the installer's experience decreases. The choices are often made based on the reading of highly cryptic or obscure manuals. Further, on some older add-on boards, the actual configuration depends on the familiarity of the user with the printed circuit board. Although the appearance of add-on boards which support software reconfigurability via a Plug and Play (PnP) specification has eased the installation process somewhat, a need remains for an apparatus and a method for transparently resolving resource conflicts amongst the devices of the computer system.

Conflict resolution is the automated process of detecting resource conflicts and configuring peripheral devices so that they can work concurrently by using unique (or non-unique, and sharable) resources. The great difficulty experienced in resolving system conflicts is caused by the premium in system resources. Typically, a personal computer's architecture limits the number of system resources available to the devices, and each device can use any combination of the four resource types: interrupt request (IRQ) lines, direct memory access (DMA) channels, input-output (I/O) addresses and memory (MEM) addresses. The system's available resources are limited because the architecture restricts them to the following: 16 IRQ lines, 8 DMAs, I/O addresses within the region of 0x0000–0xFFFF and memory address ranges inside 0x00000000–0xFFFFFFFF. The DMA channels allow the peripherals to communicate with each other at burst speeds to move blocks of memory at a time. The interrupt vectors can often be shared with other devices, so long as only one device is in active use at any one time. The I/O ports are control registers by which the personal computer controls a particular hardware. The I/O ports may never be shared with any other devices. With respect to the memory, a section of personal computer address space, unused by the personal computer physical memory, virtual memory or other hardware devices, is available for interfacing to the peripheral devices. In modern peripheral devices, the setting of the interrupt, DMA and address options is performed by programming in various software-activated options. The initialization of software-activated options has to be included in special initialization procedures. As a result, configuration was very complex and time consuming. Further, conflicting devices which attempt to use the same machine resources need to be reconfigured to use unique resources after they have been detected. The memory segment configuration is the most common source of conflict due to (a) the limited amount of free memory address space under one megabyte, (b) the large number of programs, devices and memory managers vying for memory address space, and (c) the ability of the 80386 or later processors to dynamically reassign the memory address space. Further, unlike interrupt vector or I/O port conflicts which are hardware based, memory conflicts can be caused by conflicting software options.

The number of devices in the system using some combination of the above resources depends on the system and varies greatly. The system when shipped may contain roughly 18 devices and have roughly 4 slots for plug-in expansion cards. Since a plug-in card can usually have up to eight devices on a card, the number of devices in a system can increase significantly. Thus, it is not unheard of to have forty or fifty devices in a system, all clamoring for system resources. As the personal computer requires conflict-free configuration of resources for successful use, if the newly added peripheral is assigned to use resources already occupied, the resulting configuration conflict can produce a variety of symptoms: at one extreme, the personal computer may not boot, at the other extreme all devices may appear to function but operate with intermittent failures.

Further, interdependencies can exist between resources and affect the number of potential configurations for a device, the method by which resource combinations are assembled within the conflict resolution, and ultimately, the ease of resolving conflicts. Typically, one or more of a device's resource requirements may be defined as independent. Such a resource can be assigned any possible non-conflicting value supported by the device without checking any of its other resource requirements. Because of this flexibility, independent resources are considerably easier to assign to a device. It is also important to note that a device defining an independent resource must be configured to use that type of resource.

Two or more of a device's resource requirements may defined as dependent. Such resources can only be assigned in groups. Dependent resources are considerably more difficult to assign to a device as they limit the number of possible working configurations that can be assigned to a device. Further, some devices may use different resource types for different dependent resource groups.

To resolve system conflicts, the user historically had two choices. The first is to use a set-up package which is activated by pressing a F10 key upon a power-on-self-test (POST) sequence so that each resource value for each device can be altered until a conflict-free environment is established. For details of such a method, and for a review of the problems of conflict resolution generally, see U.S. Pat. No. 5,450,570, issued on Sep. 12, 1995 to Richek, et al., which is hereby incorporated by reference. The second option is to rely on a Plug and Play (PnP) operating system, such as Windows 95 to resolve the conflicts. However, both options are prone to failure in situations involving a large number of peripheral devices and options. Thus, what is needed is an apparatus and a method for setting up and installing expansion peripheral devices quickly and with confidence that the installation is correct.

SUMMARY OF THE INVENTION

The present invention resolves conflicts in the computer system with one or more devices and one or more system resources and where each of the devices has an existing configuration and one or more acceptable configurations. The devices are represented as one or more objects corresponding to each of the devices. Each object has a move procedure and a fit procedure. The move procedure requests objects representative of other devices to move from their existing configurations, while the fit procedure attempts to fit an acceptable configuration of the object into the system resources. The objects are linked together using a tree structure. When a new or unconfigured device is to be added to the system, the apparatus provides a new or unconfigured object representative of the new or unconfigured device. The new or unconfigured object calls the fit procedure to attempt to fit itself into said system resources and, if a non-conflicting configuration is available from the acceptable configurations for the new or unconfigured device, to set the configuration of the new or unconfigured device to the non-conflicting configuration. Otherwise, the object communicates with the remaining objects to request remaining devices to select another configuration from their acceptable configurations until a non-conflicting configuration is available for said first device.

BRIEF DESCRIPTION OF THE DRAWINGS

A better understanding of the present invention can be obtained when the following detailed description of the preferred embodiment is considered in conjunction with the following drawings, in which:

FIG. 14 is a diagram illustrating an example of communications between three objects representative of devices A, B and C which utilize FIT_ME and MOVE_ME processes to resolve resource conflicts in accordance with the present invention;

DETAILED DESCRIPTION OF THE PREFERRED EMBODIMENT

Figure 1:
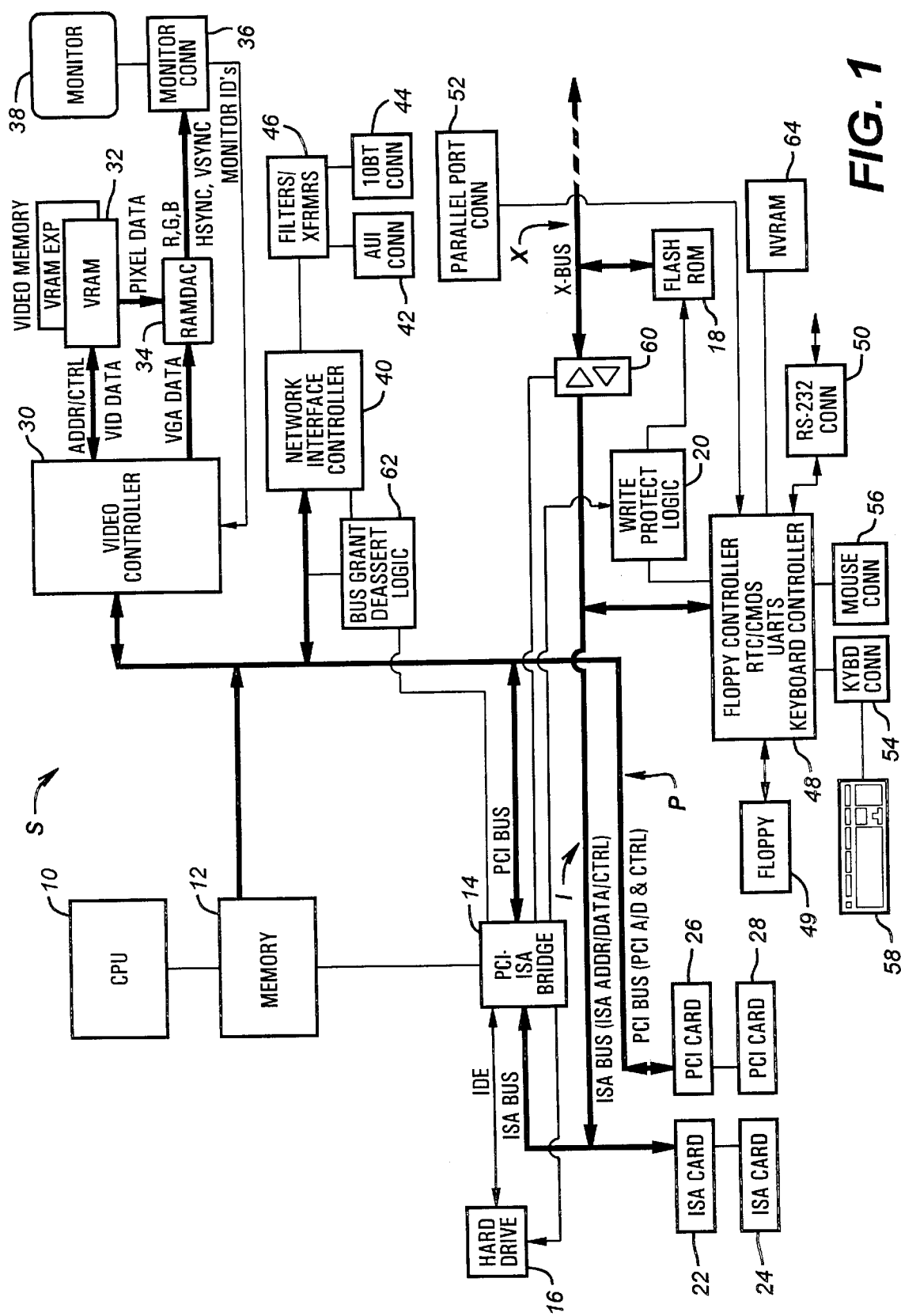
FIG. 1 is a block diagram of a computer system having resource conflict detection capability in accordance with the present invention.

Referring now to FIG. 1, a computer system S according to the present invention is shown. In FIG. 1, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

The computer system S includes a processor 10 which is connected to a memory subsystem 12. The processor 10 is preferably the Pentium Pro® processor from Intel Corporation, but could be an 80486 or any number of similar or next-generation processors. The memory subsystem 12 includes a memory array and a memory controller. The memory subsystem 12 preferably includes a cache memory to provide additional caching capabilities that improve the overall performance of the computer system S.

The memory subsystem 12 is connected to both the PCI bus P and a PCI-ISA bridge 14. The PCI-ISA bridge 14 is used to convert signals between the PCI bus P and the ISA bus I. The PCI-ISA bridge 14 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 16 is connected to the IDE interface of the PCI-ISA bridge 14. Tape drives, CD-ROM devices or other peripheral storage devices (not shown) can be similarly connected. The PCI-ISA bridge 14 is also connected to a flash ROM 18 through write protection logic 20. Preferably, the PCI-ISA bridge 14 is a single integrated circuit, but other combinations are considered within the scope of the invention.

A series of ISA adapter cards 22,24 are connected to the ISA bus I through slots. A series of PCI adapter cards 26, 28 are similarly provided on the PCI bus P through slots. The ISA cards are preferably Plug and Play compatible.

A video controller 30 is also connected to the PCI bus P. Video memory 32 is used to store graphics data and is connected to the video graphics controller 30 and a digital/analog converter (RAMDAC) 34. The video graphics controller 30 controls the operation of the video memory 32, allowing data to be written and retrieved as required. A monitor connector 36 is connected to the RAMDAC 34 for connecting a monitor 38.

A network interface controller (NIC) 40 is also connected to the PCI bus P through bus grant deassert logic 62. Preferably, the controller 40 is a single integrated circuit that includes the capabilities necessary to act as a PCI bus master and slave, as well as circuitry required to act as an Ethernet interface. Attachment Unit Interface (AUI) 42 and 10 base-T connectors 44 are provided in the system S, and are connected to the NIC 40 via filter and transformer circuitry 46. This circuitry forms a network/Ethernet connection for connecting the computer system S to a local area network (LAN).

A combination I/O chip 48 is connected to the ISA bus I. The combination I/O chip 48 preferably includes a real time clock, two UARTS, a floppy disk controller for controlling a floppy disk drive 49, and various address decode logic to control access to a non-volatile random access memory (NVRAM) 64. The NVRAM 64 uses an Extended System Configuration Data (ESCD) format and stores resource information for static or non-Plug and Play devices. Additionally, a control line is provided to the read and write protection logic 20 to further control access to the flash ROM 18. Serial port connectors 50 and parallel port connector 52 are also connected to the combination I/O chip 48.

An 8042, or keyboard controller, is also included in the combination I/O chip 48. The keyboard controller is of conventional design and is connected in turn to a keyboard connector 54 and a mouse or pointing device connector 56. A keyboard 58 is connected to the computer system S through the keyboard connector 54.

A buffer 60 is connected to the ISA bus I to provide an additional X-bus X for various additional components of the computer system S. The flash ROM 18 receives its control, address and data signals from the X-bus X. Preferably, the flash ROM 18 contains the BIOS information for the computer system and can be reprogrammed to allow for revisions of the BIOS.

Figure 2:
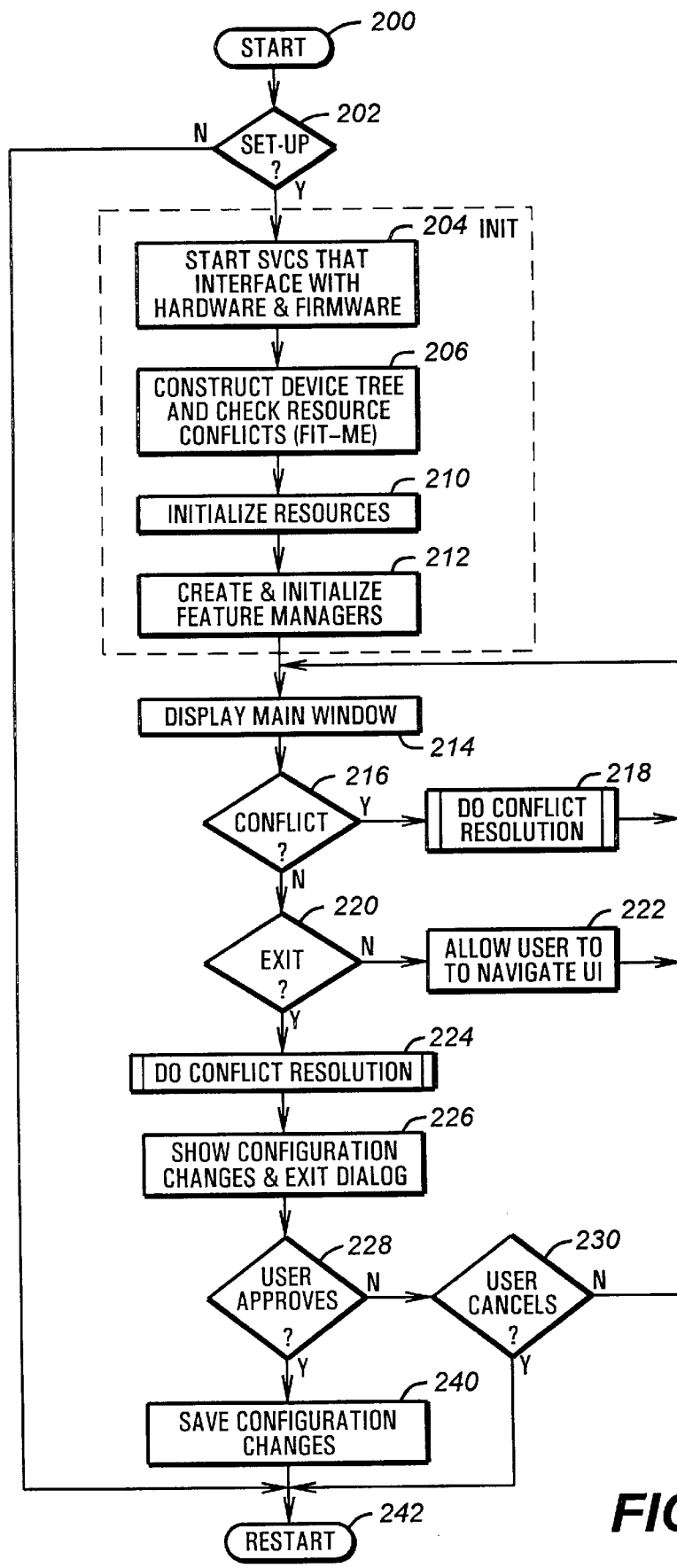
FIG. 2 is a flow chart of a conflict resolution process for the computer system of FIG. 1 in accordance with the present invention.

Turning now to FIG. 2, shown is a flowchart of the conflict resolution process according to the invention. After the computer system has been turned on in step 200, the computer system S determines whether a setup is be performed in step 202. The user can enter the setup mode via two different ways: one via the F10 partition, the other via the computer setup diskette. The F10 partition method requires that a user presses F10 key when a flashing cursor appears in the upper right-hand corner of the computer screen during POST. Next, when the F10 menu appears, the user must select a computer setup option and tell the computer to restart the machine.

The second method requires a computer setup diskette which the user places in the disk drive and reboots the machine. The user then selects the computer setup from the menu and the application continues with the initialization which includes steps 204–212. During initialization, the software of the present invention initializes and sets up the various classes and resources needed to run the application. The initialization of the application can be divided into three phases: an instantiation of services phase, a finding of devices in the system, and a checking of devices for resource conflicts.

In the first phase which includes step 204 of FIG. 2, the application starts a number of services that interface with the firmware and hardware. The first three services allow access to the BIOS firmware, such as the Plug and Play BIOS and PCI BIOS. The next two services also reference firmware and include services that interface with the system information table and CMOS memory. The next service instantiated by the application interfaces with the Plug and Play BIOS to retrieve information about embedded devices. It is followed by services that interface with the ESCD within the NVRAM 64 to retrieve information about various cards in the system. Finally, services that examine the ISA and PCI buses in the system for devices are initialized.

From step 204, the routine of FIG. 2 proceeds to step 206 where a device tree is constructed using various services initialized in step 204. Then, each device noted in the tree is checked for resource conflicts and initialized appropriately. Step 206 is discussed in more detail in FIG. 3. From step 206, the routine of FIG. 2 proceeds to step 210 where it initializes the resources. In the event of a conflict, the routine reports the conflict to the user and allows the user to perform a minimal conflict resolution if he or she desires. The minimal conflict resolution essentially allows the conflicting device to execute a Move-Me function, as described below. Next, in step 212, the routine of FIG. 2 creates and initializes various feature managers, such as a security manager and a boot manager. In this manner, steps 204–212 initialize the conflict resolution engine (CRE).

After initialization, the main window of the set-up application is displayed in step 214 and the control is turned over to the user. At this point, the user has the option of resetting the resource type priority list which is set to a default priority order. In the event of a conflict, a conflict option is enabled in the menu tool bar in step 216. Further, a conflict dialog box is displayed to indicate to the user that a full conflict resolution can be performed. In the event that the user selects this option, the routine proceeds from step 216 to step 218 where it performs a full conflict resolution. If not, the routine proceeds from step 216 to step 220 where it checks if the user has selected an exit option. If not, the routine allows the user to continue to navigate the user interface in step 222. From step 218 or step 222, the routine loops back to step 214 where the main window is displayed.

Alternatively, in the event that the user desires to exit the application in step 220, a dialog is displayed in the event one or more conflicts exist. Further, the routine proceeds from step 220 to step 224 where once more a full conflict resolution is performed. Assuming that the conflict resolution is successful in step 224, the configuration changes are displayed in step 226 for the user to review and approve. Further, an exit dialog is also displayed. Next, in step 228, in the event that the user approves the configuration changes, the routine proceeds from step 228 to step 240 where virtual configuration changes are saved and the actual configurations of the devices are updated before the routine restarts the computer in step 242 by performing a warm boot. From step 228, in the event that the user does not approve of the changes, the routine then checks if the user desires to cancel the setup session in step 230. If so, the routine proceeds from step 230 to step 242 to restart the computer. Alternatively, in the event that the user does not wish to cancel the setup, the routine proceeds from step 230 back to step 214 to allow the user to continue navigating the user interface.

From step 202, in the event that a setup is not desired, the routine of FIG. 2 proceeds from step 202 to step 242 to restart the computer.

Before turning to details of the operation of the conflict resolution engine (CRE), a general overview of the operation of the conflict resolution process according to the invention is deemed appropriate. Conflict detection is the first step of conflict resolution. A device's resources must be available to the CRE in order for it to work. A device's non-sharable resource will conflict with another device's resource if the resource value is the same. For specific resource types, this will translate to the same IRQ line or DMA channel, and overlapping I/O or memory ranges. A device's sharable resource will conflict with a another device's non-sharable resource if the resource value is the same. Also, the number of devices sharing a particular resource is limited.

The conflict resolution problem requires that conflicting devices be moved to an alternate configuration. A device asked to move behaves just like a device which was added to the system. That is, it must find a supported configuration (in this case, one that changes the conflicting resource) and ensure that it does not conflict with other devices in the system. The CRE must be able to access the configuration a device is trying to move to, which we will call a potential configuration.

When a device has a potential configuration, it will detect conflicts with other system devices. If a given system device has not already been asked to move, the desired resource must be checked against the system device's current configuration since it represents the resources it already owns. If a given system device has been asked to move, the desired resource must be checked against the system device's potential configuration since it represents the resources the device will use if everything configures.

In order to cause the least amount of change to a stable system, a re-configuring device should alter as few resources as possible. If a device can find a conflict-free configuration by changing only one resource type, then that would be preferable over a conflict-free configuration that alters more than one resource types.

Pattern matching is used to retrieve possible resource combinations or configurations from a device. The pattern matching process uses patterns and masks. The pattern used to represent a resource combination template itself uses include and exclude masks. The include mask tells the device which resources in the pattern to consider. The exclude mask tells the device which resources values to avoid. In determining a possible configuration, pattern matching is used to retrieve the next valid configuration matching a pattern.

The first pattern used to get the first configuration consists of wild cards. That is, the CRE asks a device for the first resource combination, without imposing constraints. The configuration's first resource type is then checked for conflict. If none exists, the pattern is updated. The CRE requests the next resource combination by fetching the next resource combination. When the current resource type to be checked conflicts, the exclude mask is updated. The CRE first fetches the next resource combination that avoids the conflicting resource. When no more valid resource combinations are obtained, the device cannot configure without other devices reconfiguring; a conflict must be resolved. When a device is being configured by the CRE, it does so one resource type (IRQ line, DMA, etc.) at a time. The order in which resource types are evaluated can significantly impact the performance of the CRE.

Resources must be abstracted for the CRE such that the CRE views all resources consistently. The CRE views resources in a tree structure. Further, the list of possible configurations supported by a device will be deterministic. That is, a device will return the same "next" resource combination (configuration) given a particular index number and resource priority. Using the preferred tree structure, structures represented by a tree's leftmost leaves are lower in index number than the rightmost leaves. The complexity of this deterministic calculation is increased with the resource priorities and if the resources in the tree are prioritized differently, different indexes and masks may yield different "next" resource combinations.

Figure 3:
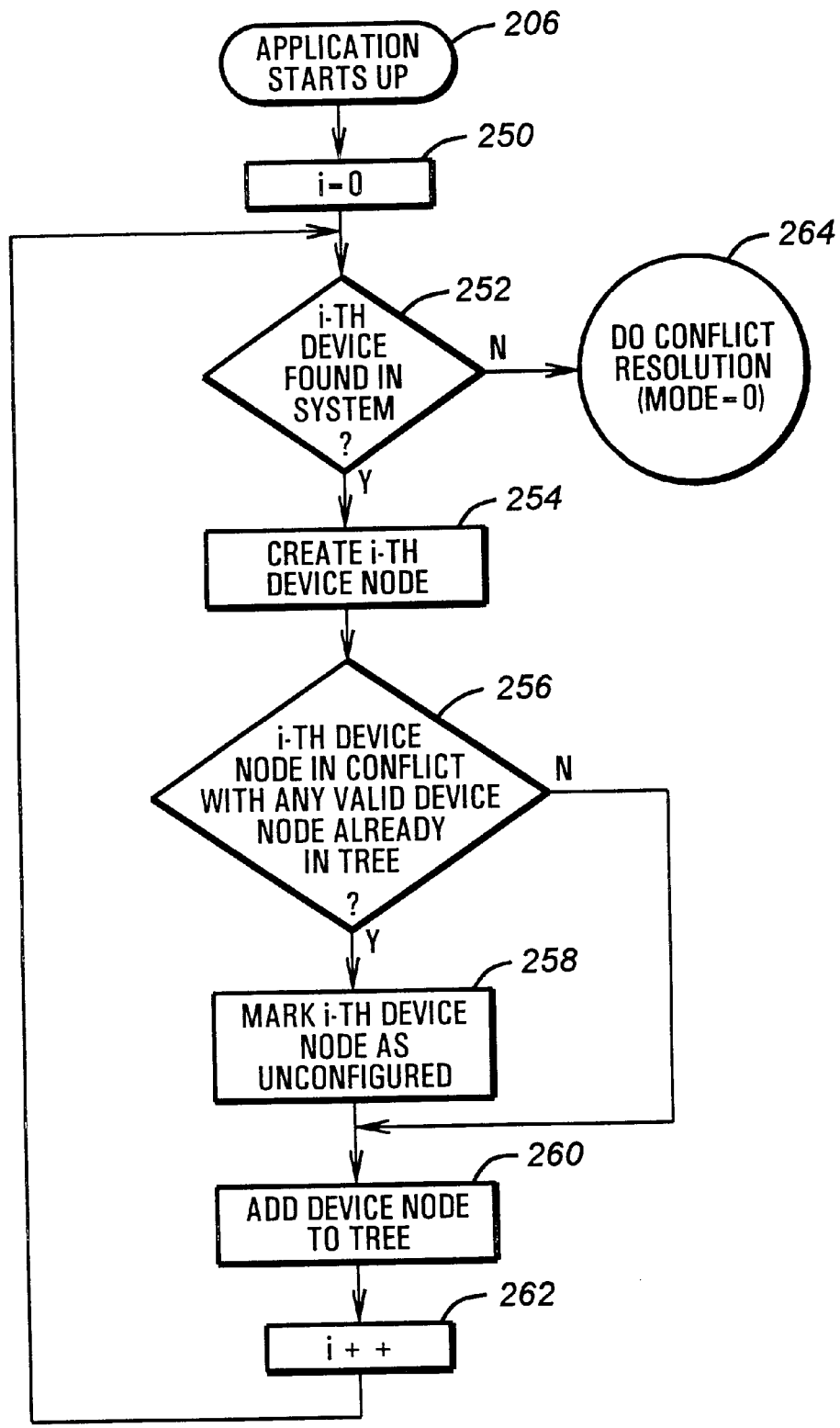
FIG. 3 is a flow chart of a process for constructing a device tree in support of the resource conflict check in FIG. 2.

The construction of the device tree and resource conflict is detailed in FIG. 3. From step 206 of FIG. 2, the routine of FIG. 3 proceeds to step 250 where it initializes the i-th device counter to 0. Next, the routine of FIG. 3 proceeds to step 252 where it checks whether the device has been found in the system. If so, the routine proceeds from step 252 to step 254 where it creates the i-th device node in the tree. From step 254, the routine proceeds to step 256 where the routine checks if the i-th device node is in conflict with any valid device node already in the tree. If so, the routine proceeds from step 256 to step 258 where it marks the i-th device node as being unconfigured. From step 258, or from step 256 in the event that the i-th device node is not in conflict with any valid device node already in the tree, the routine proceeds to step 260 where it adds the device node to the tree. From step 260, the routine proceeds to step 262 where it increments the i-counter before it loops back to step 252 to continue the device tree construction process. From step 252, in the event that the i-th device node is not found in the system, the routine proceeds to step 264 and sets a conflict resolution mode flag to indicate that only a limited conflict resolution is to be performed in step 26. The limited conflict resolution essentially only performs a Fit-Me process, as detailed below.

In step 218, when the application calls for a conflict resolution, a number of steps happen before a device node's configuration is changed. In this step, a dialog reports any resource conflicts between device nodes to the user, and the user elects either cancel, ignore or resolve the conflicts. If the user chooses to resolve the conflicts, the device tree is told to attempt to configure all of its devices via a Configure All function.

The Configure All function tells each valid device node (represented as a software object) in the tree to configure itself by calling the Configure function which determines if a device node is valid. If any device node is disabled, already configured, or without resources, it is considered inactive and is not configured. The IsDisabled function of a device node object determines whether the device node is disabled. The IsConfigurable function of a device node object determines whether a device is configurable.

Each device in the computer system constitutes a device node and is represented as an instance of a DevNode class. The DevNode class of software object contains data concerning the attributes and status of each device. It also contains various functions which aid in conflict resolution and configuration generation. In configuring devices, a configuration generator accesses ResBlock objects which serve as a containers of resource information. The resource information is stored by resource type with each type having a resource list. The configuration generator generates configurations by fetching a resource from each resource list and then filling a resource block with the fetched resources. A configuration generator also uses a class object ResCfg which serves as a container for device resources used at any one time. For each resource type, a list of the resource items that can be used by a device at any one time and a list of all possible resource lists for a particular configuration are stored in class objects.

Figure 4:
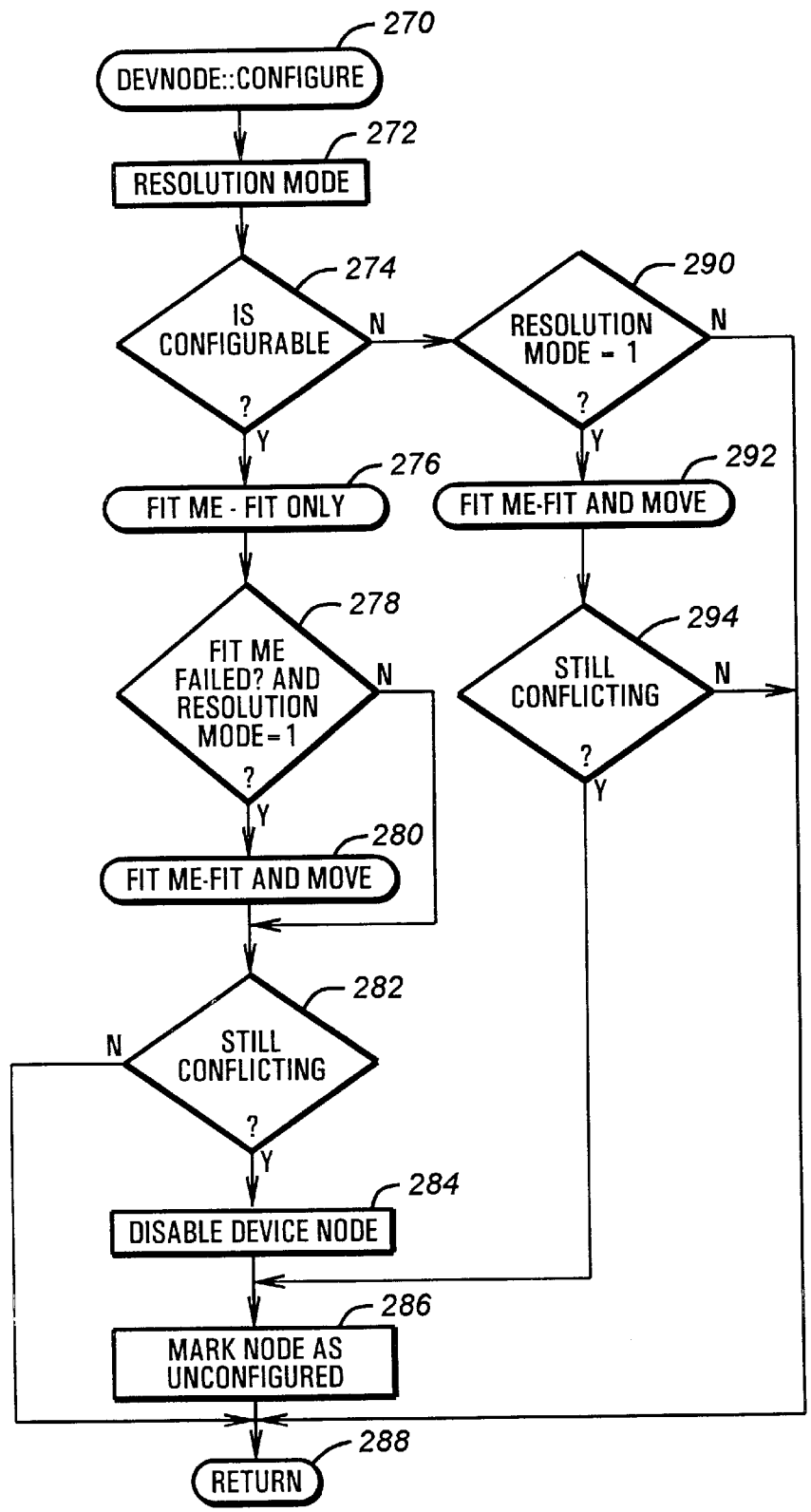
FIG. 4 is a flow chart for a configuring process in accordance with the flow chart of FIG. 2.

Turning now to FIG. 4, the process for configuring the devices nodes is shown in more detail. Each device object has such a configuration process. In FIG. 4, from step 270, the routine obtains in step 272 the conflict resolution mode previously set in step 264 of FIG. 3. From step 272, the routine then checks if the device node is configurable or not, as not all devices can change their current resource configuration. From step 274, in the event that the device is configurable, the routine proceeds to step 276 where it attempts to fit itself or its resource configuration into the system represented by the device tree by calling on a Fit-Me function in step 276. The Fit-Me function of step 276 is called in a Fit-Only mode which causes the device node to attempt to move to an alternate configuration to resolve the resource conflict. From step 276, in the event that Fit-Me failed and the resolution mode obtained in step 272 is a 1, indicating a full resolution mode, where both Move-Me and Fit-Me are performed, the routine proceeds to step 280 to invoke Fit-Me once more, but this time allowing the resource to move. From step 280 or from step 278 in the event that either Fit-Me succeeded or the conflict resolution mode is not equal to 1 (not full resolution), the routine proceeds to step 282 where it checks for additional conflicts. In step 282, in the event that the conflict remains, the routine disables the device node in step 284 and proceeds to step 286 where it marks the node as unconfigured. From step 286 or from step 282 in the event that there is no conflict, the routine returns via step 288.

In step 274, in the event that the device is not configurable, the routine proceeds to step 290 where it checks if the resolution mode obtained in step 272 is a 1, which indicates a full resolution mode where both Move-Me and Fit-Me can be invoked. If so, the routine proceeds from step 290 to step 292 where objects representative of devices are told to perform the Fit-Me function and if the objects cannot fit, then they in turn request other objects to move. From step 292, the routine checks if conflicts remain in step 294. If so, the routine proceeds from step 294 to step 286 where it marks the node as unconfigured before it returns in step 288. From step 290, in the event the resolution mode is not equal to 1, or from step 294, in the event that there is no conflict, the routine proceeds to step 288 where it returns.

In this manner, if none of the alternate configurations are successful in resolving the conflict, and full resolution has been requested as indicated by the resolution mode flag, Fit-Me is called again in full resolution mode. In the full resolution mode, in the event that the node still fails to configure successfully without conflicts, the node disables itself. Alternatively, if the device node is not configurable and full resolution has been requested by the resolution mode, the initial call to Fit-Me is made in a full resolution mode to allow other devices to change configurations to resolve conflicts with a nonconfigurable device. Additionally, in the event that Fit Me is unsuccessful, the node marks itself as unconfigured.

To facilitate device configuring, device node attributes are maintained. The node attributes maintained by the DevNode class include the parent node of a node, the child node of a node, the next sibling node of a node, a node identifier, a device identifier, an ISA Plug and Play serial number, an ESCD board type, a Plug and Play device type, attributes from the Plug and Play BIOS specification, and a unique number corresponding to a Plug and Play node or an ESCD slot. Other device attributes include whether a device can be dynamically configured, whether a device can only be dynamically configured, and whether a device node has been disabled or enabled. The DevNode class also includes the functions necessary to retrieve these attributes.

Functions for maintenance of the device tree are included in the DEVTREE class. The GetNodeCount function retrieves the current number of nodes in a tree. The GetRoot function retrieves the root of the device tree. The GetCurr function retrieves a tree's current node. The SetCurr function establishes a tree's current node. The DEVTREE class also houses functions for retrieval of a parent node, child node, and sibling node.

Turning now to the Fit-Me function, Fit-Me is a recursive function which evaluates a potential replacement configuration resource type by resource type, resource item by resource item, with each resource item represented as a resource value. Fit-Me operates by preparing and verifying information given and calculated. It also determines a possible alternate configuration matching a configuration pattern and verifies the configuration fit within the system by comparing it against other nodes in a deterministic order. Once Fit-Me has finished fitting a particular resource item, the function then prepares to evaluate the next resource item, and calls itself recursively. Finally, once the necessary resource items and types have been evaluated, the fit of the full configuration is verified.

Figure 5A:
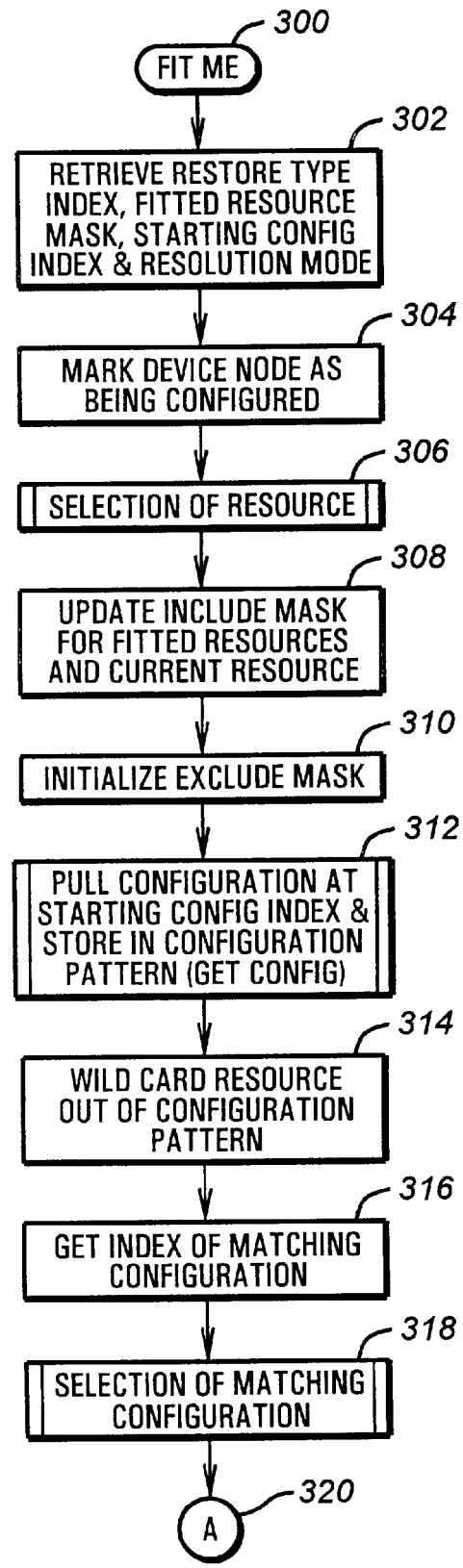
FIGS. 5A and 5B are flow charts for a FIT_ME process in accordance with the conflict resolution process of FIG. 2.

Turning now to FIGS. 5A–5F, the process for initializing Fit-Me is shown in more detail. In FIG. 5A, from step 300, Fit-Me retrieves the resource type index, fitted resource mask, starting configuration index and resolution mode parameters in step 302. These parameters supply the function with the current resource type, the resource values that have already been fitted for that resource, the index to the alternative configuration to start checking for a new non-conflicting configuration, and the resolution mode indicating whether or not to move other devices to accommodate the current resource type.

Figure 5B:
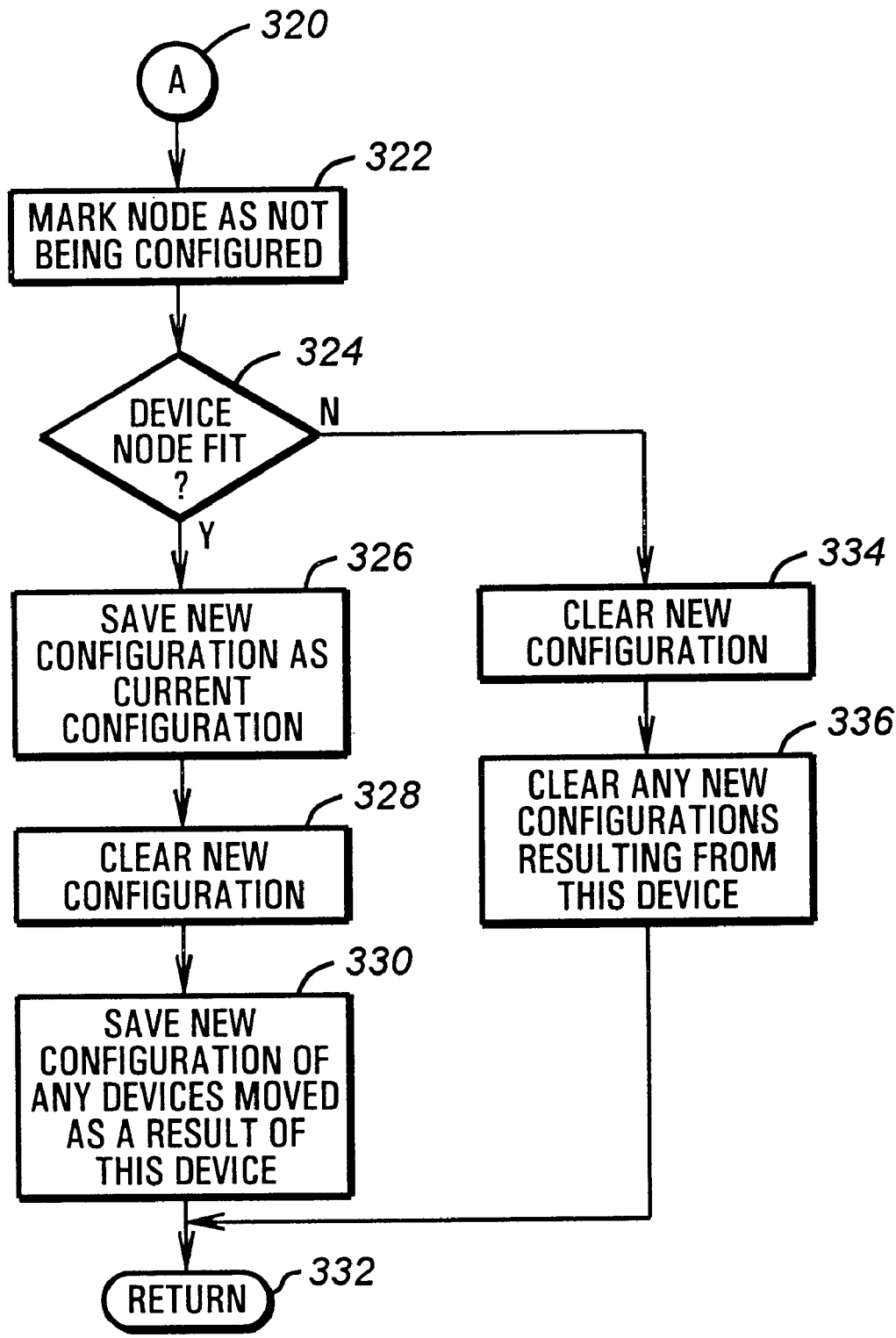
Figure 5C:
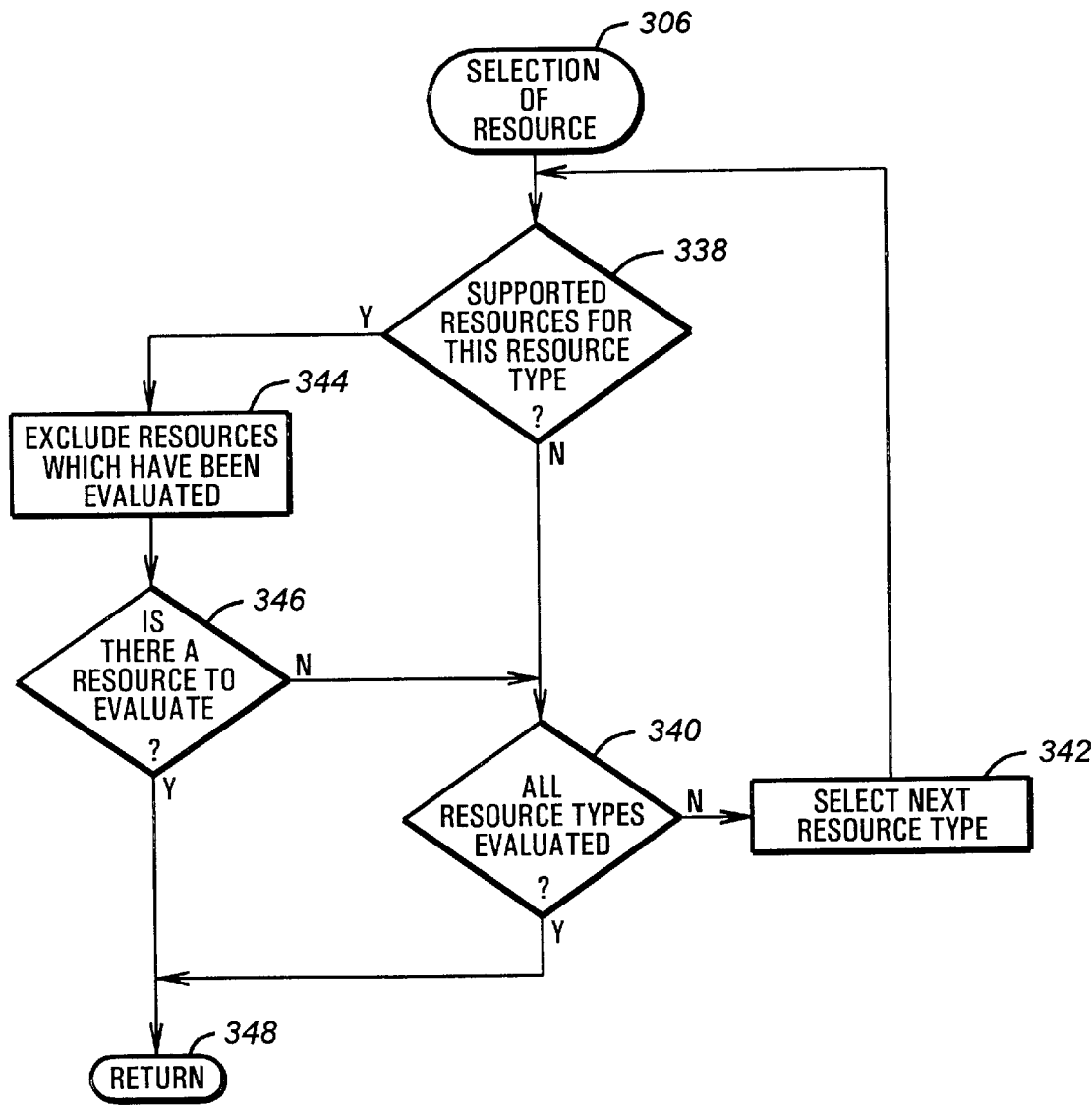
FIG. 5C is a flow chart of a process for resource selection in accordance with the process of FIGS. 5A and 5B.

From step 302, the function proceeds to step 304 where it marks the current node as being configured. After marking the node as being configured in step 304, the function proceeds to step 306 where it selects a resource. Turning to FIG. 5C, selecting a resource is discussed in more detail. From step 306, the function proceeds to step 338 where it determines the supported resources for the particular resource type. The resource type index indicates the current resource type. In step 338, Fit-Me utilizes a CalcSupportedResMap function to calculate the resource items supported for the current resource type. If the device node does not have supported resources for the current resource type, then the function proceeds to step 340. In step 340, the function determines whether all resource types have been evaluated. If not, then the function proceeds to step 342. At step 342, the function selects the next resource type. After that selection, the function returns to step 338 and determines if the device has supported resources for the next resource type. If all resource types have been evaluated, the function returns via step 348 and exits step 306.

In step 338, the function proceeds to step 344 if the device has supported resources for the current resource type. At step 344, the function excludes resources which have already been evaluated using an exclude mask. Next, in step 346, the function determines if there is a resource to evaluate. In the event there is a resource to evaluate, the function returns through step 348. If there are no resources left to evaluate for the current resource type, the function proceeds to step 340 where it is determined whether all resource types have been evaluated. From step 340, the function proceeds as described above.

Returning to FIG. 5A, the Fit-Me function next updates the configuration include mask for fitted resources and the current resource in step 308. The configuration include mask is preferably updated by an OR operation between a mask representing the current resource and a mask representing fitted resources. It should be understood that an include mask may be implemented using other logical operations. From step 308, the function proceeds to step 310 where it initializes the configuration exclude mask. Next, in step 312, the function pulls the configuration at the starting configuration index and stores the configuration in the configuration pattern. The pulled configuration is the first configuration indicated by the starting configuration index.

Figure 5D:
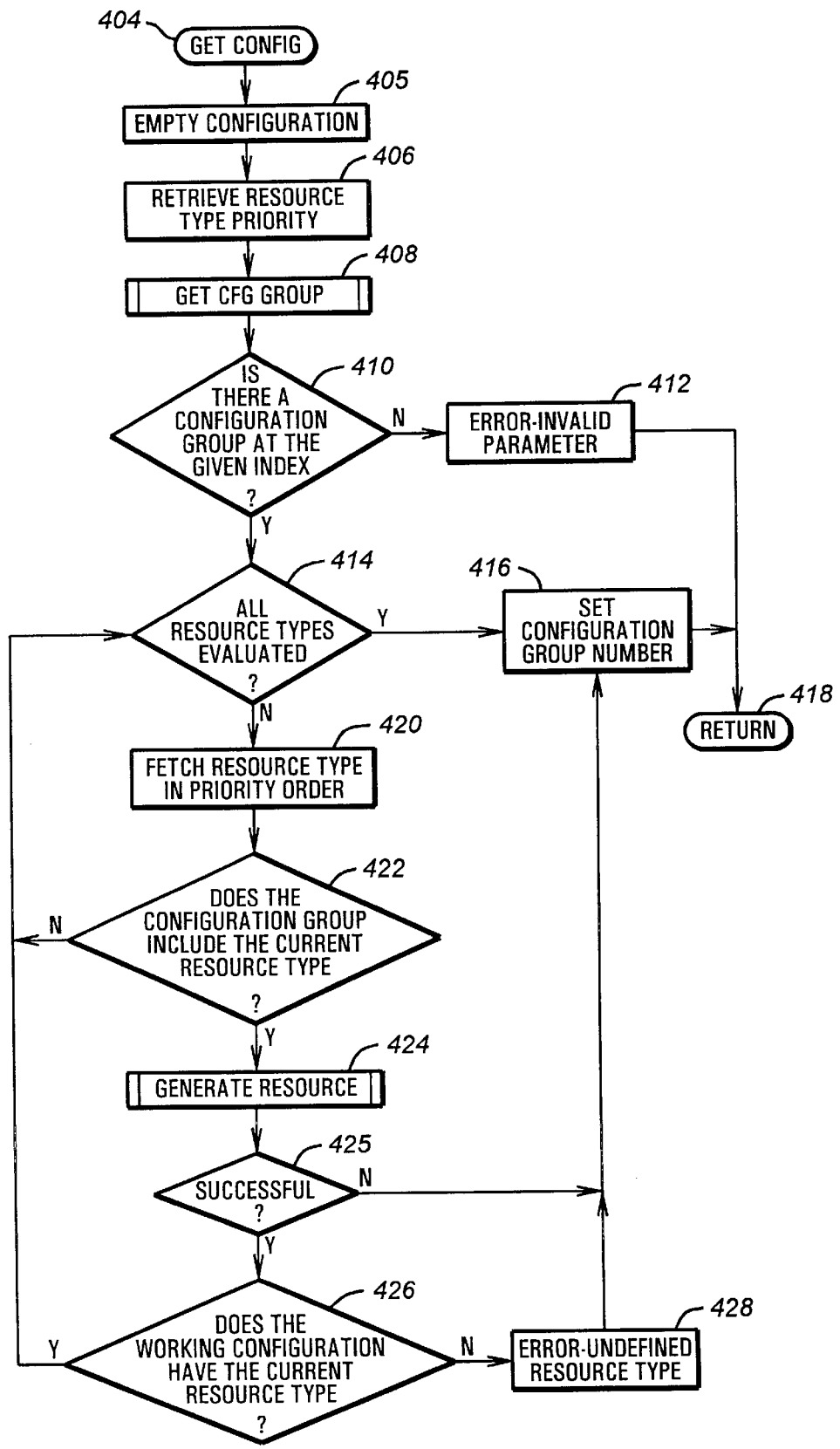
FIG. 5D is a flow chart of a process for generating a configuration for a device of the computer system of FIG. 1.

Fit-Me pulls or generates the starting configuration from the starting configuration index by calling a GetConfig function which is shown in FIG. 5D. The GetConfig function and the relation functions called by the GetConfig function are shown in FIGS. 5D–5G. The GetConfig function is called in step 404. In step 404, the GetConfig function proceeds to step 405 where the function empties the configuration. Next, in step 406, the function retrieves the resource type priority. The function next proceeds to step 408 where it calls the GetCfgGroup function to generate a configuration group. From step 408, the function proceeds to step 410 where it is determined if there is a configuration group at the configuration group index. If so, the function proceeds to step 414. If there is not a configuration group, the function proceeds to step 412 where an error signal is generated.

Figure 5E:
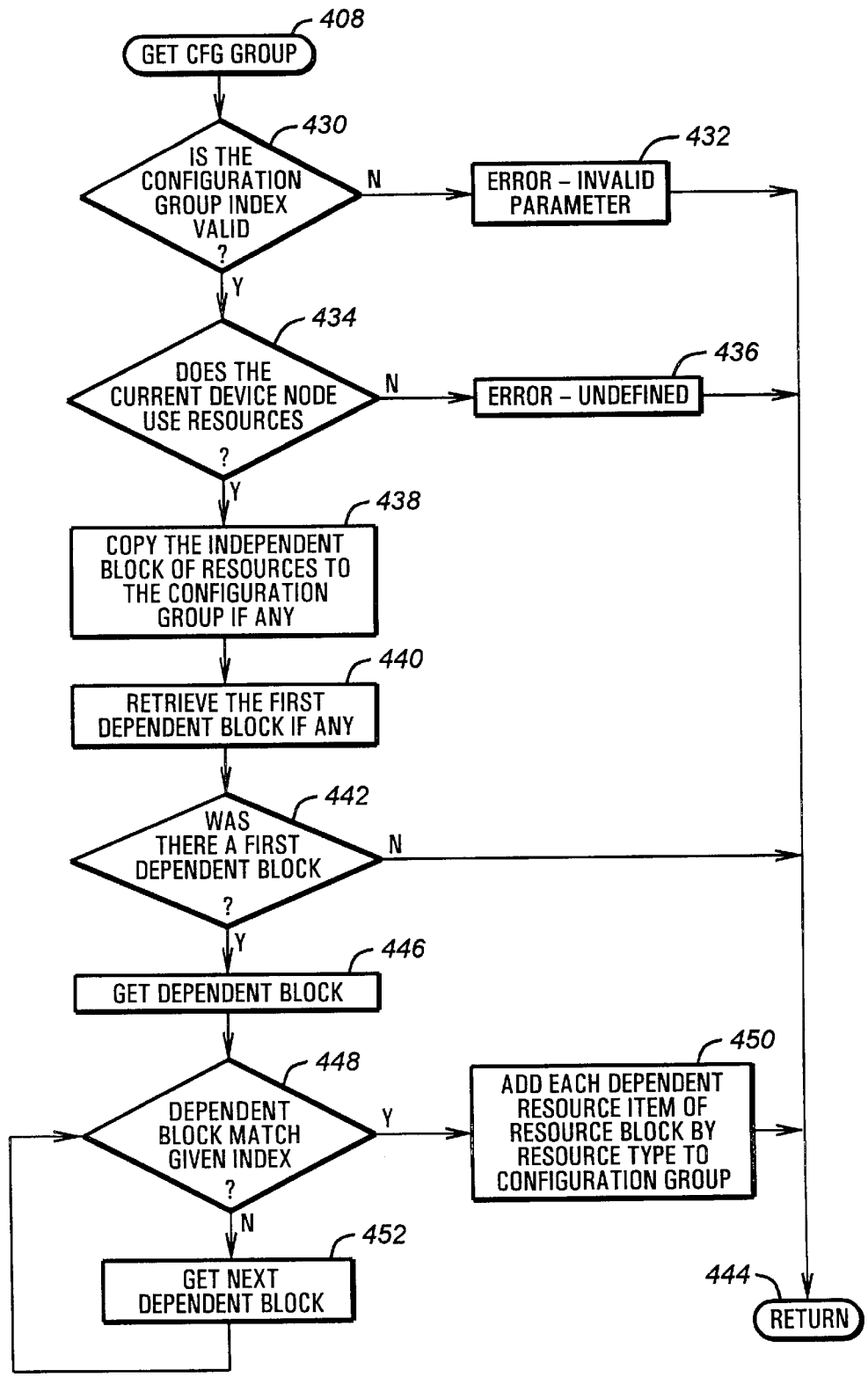
FIG. 5E is an illustration of a process for generating a configuration group for a device of the computer system of FIG. 1.

The GetCfgGroup function of step 408 is shown in FIG. 5E. The function begins by proceeding to step 430 where it is determined if the configuration group index is valid. If the configuration group index is invalid, the function proceeds to step 432 where an error signal is generated. From step 432, the function returns through step 444. If the number of configuration groups is valid, the function proceeds to step 434. In step 434, the function determines whether the current device node uses resources. If the current device does not use resources, the function proceeds to step 436 where an error signal is generated. From step 436, the function returns through step 444. If the current device node does use resources, the function proceeds to step 438 and copies the independent block of resources if any to the configuration group. The function then proceeds to step 440 where the function retrieves the first dependent block, if any.

From step 440, the function proceeds to step 442 where it is determined if there was a first dependent block. If not, the function proceeds to step 444 where it returns to the GetConfig function. If there was a dependent block, the function proceeds to step 446 wherein the dependent block is fetched. From step 446, the function proceeds to step 448 where it is determined if the fetched dependent block matches the given configuration group index. If not, the function proceeds to step 452 wherein the next dependent block is fetched. From step 452, the function loops back to step 448. Once the fetched dependent block matches the given configuration group index in step 448, the function proceeds to step 450. In step 450, the function adds each dependent resource item of the matching dependent resource block by resource type to the configuration group based on a prioritized resource type list. From step 450, the function returns through step 444 to the GetConfig function. Thus, the GetConfigGroup function copies and combines resource blocks forming a configuration group such that a configuration may include only an independent block, only a dependent block or may include independent and dependent resource blocks.

Once the GetCfgGroup function in step 408 is fully executed, the GetConfig function proceeds to step 410. From step 410, if there is configuration group at the given configuration group index, the function proceeds to step 414. In step 414, the function determines if all resource types have been evaluated. If so, the function proceeds to step 416 where the function sets the configuration group number by storing the configuration group index. After that number is set in step 416, the function proceeds to step 418 and returns completing the GetConfig function. If all resource types have not been evaluated in step 414, the GetConfig function proceeds to step 420 where a resource type is fetched based on a prioritized resource type list. From step 420, the function proceeds to step 422 where it is determined if the configuration group includes the current resource type. If so, the function proceeds to step 424 wherein the GenerateResource function is executed. If not, the function loops back to step 414. In this way, the function identifies the resource types included in the configuration group so that resources of the identified resource types may be generated.

Figure 5F:
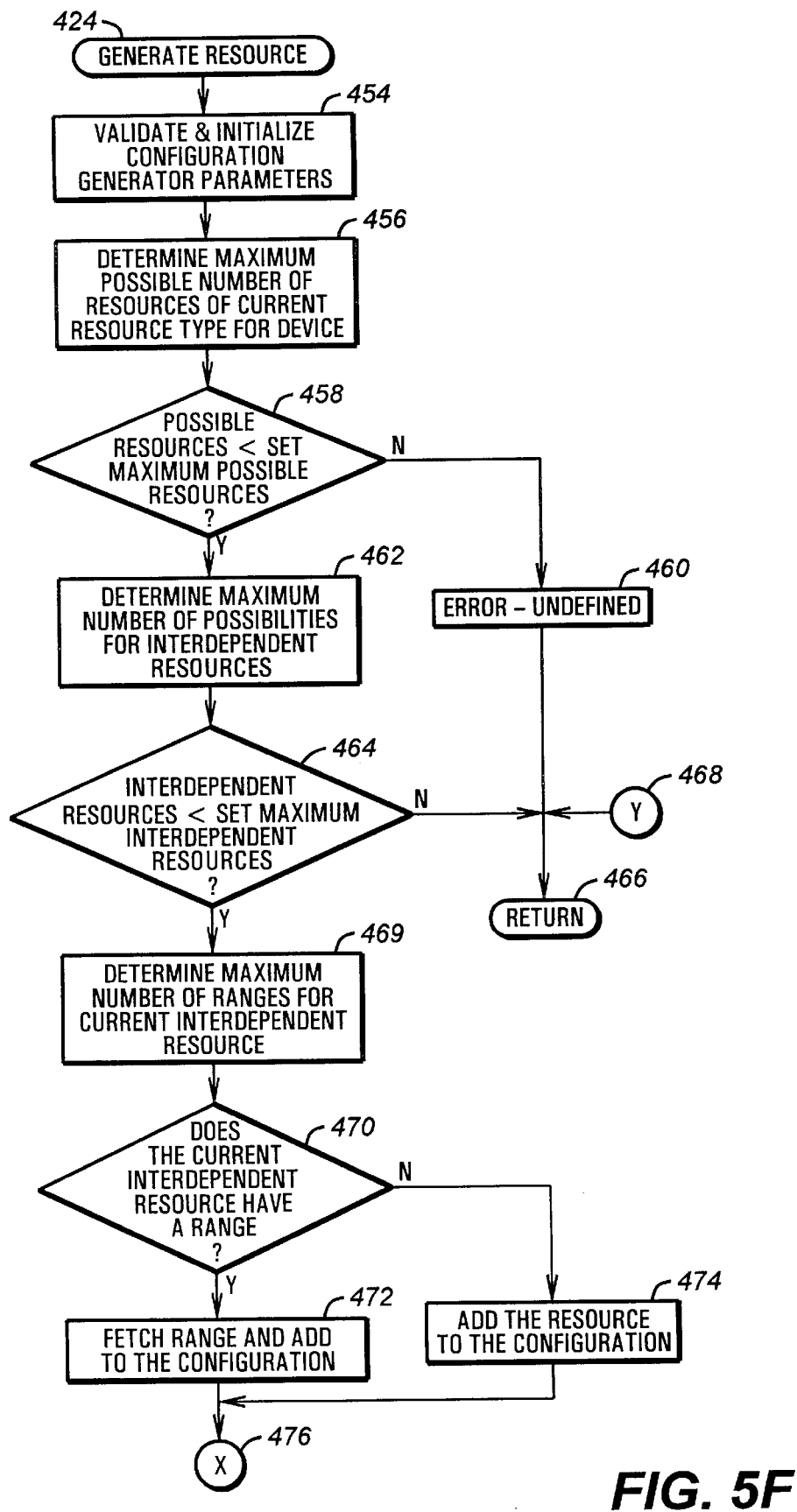
FIGS. 5F and 5G are a process for generating a resource for a device of the computer system of FIG. 1.
Figure 5G:
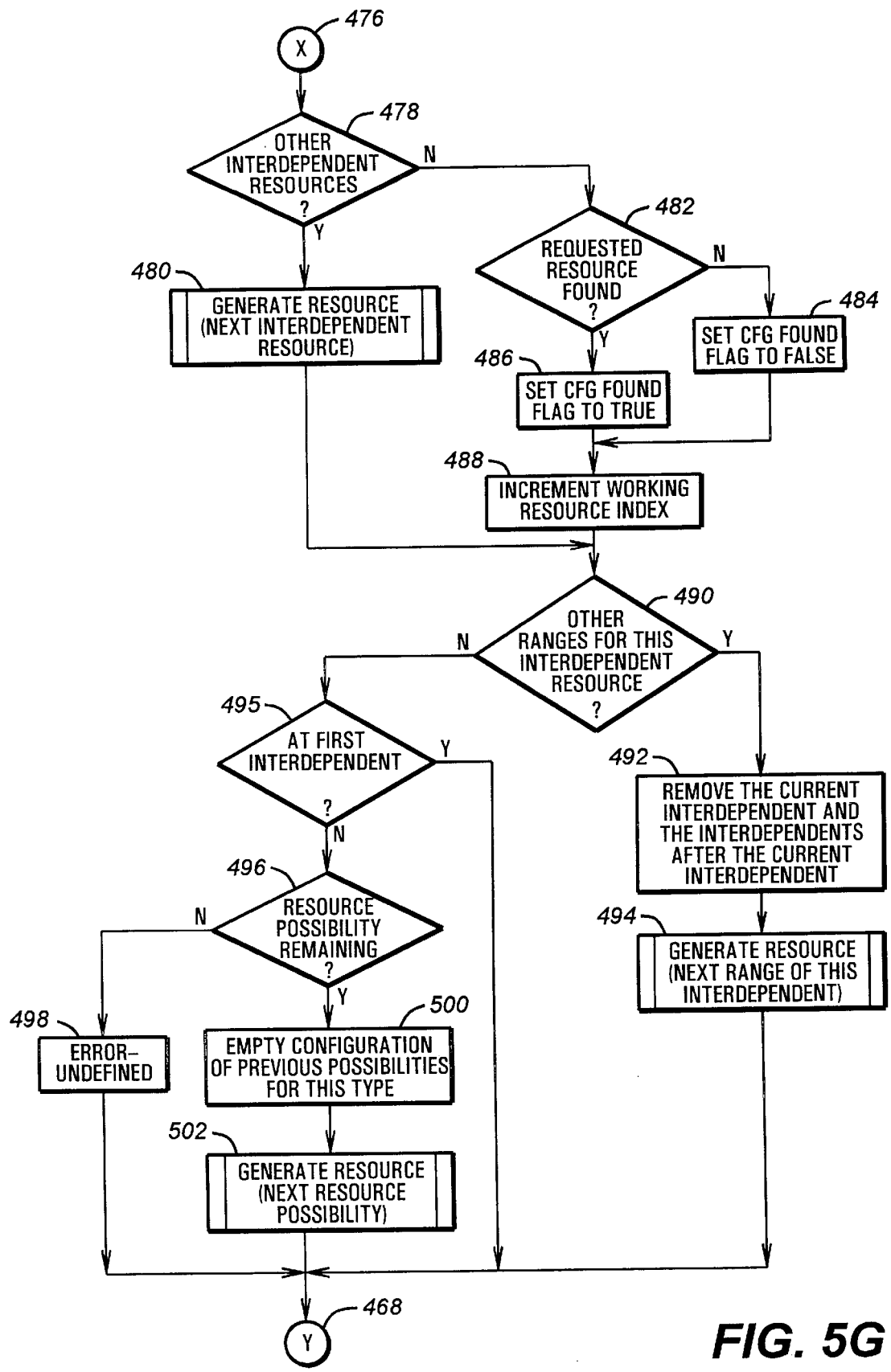

Steps of the GenerateResource function of step 424 are shown in FIGS. 5F–5G. The GenerateResource function generates a resource by dealing with a particular resource type and particular configuration group at a time. The arguments used by the function include an interdependent index for retrieving an interdependent resource, a working resource index for tracking the working resource, a range index for retrieving a range, and a current resource combination index for tracking the current resource combination or potential configuration. The function begins at step 454.

In step 454, the function validates and initializes the configuration generator parameters. These parameters include the working configuration group and the working resource type. Next, the function proceeds to step 456 where it determines the maximum possible number of resources of the current resource type for the device. From step 456, the function proceeds to step 458 where it is determined if the possible resources for the current resource type is less than the set maximum number of possible resources for the current resource type. If not, the function proceeds to step 460 wherein an error signal is generated. From step 460, the function returns through step 466 to the GetConfig function. If so, the function proceeds to step 462 where the maximum number of possibilities for interdependent resources is determined.

Next, the function proceeds to step 464 where it is determined if the number of interdependent resources is less than the set maximum number of interdependent resources. If not, the function proceeds to step 466 where it returns to the GetConfig function. If so, the function proceeds to step 469. In step 469, the function determines the maximum number of ranges for the current interdependent resource. Next, in step 470 the function determines if the current interdependent resource has a range. If it does have a range, the function proceeds to step 472 wherein the range is fetched and added to the configuration. If the current interdependent resource does not have a range, the function proceeds to step 474 wherein the resource is added to the configuration. From both steps 472 and 474, the function proceeds to the X connector in step 476.

From the X connector of step 476, the function proceeds to step 478. Where it is determined if there are other interdependent resources. If there are other interdependent resources, the function proceeds to step 480 where the GenerateResource function of step 480 is executed. In this step, the current GenerateResource function calls itself for the next interdependent resource. In this way, each GenerateResource function called in step 480 function continues to call itself at step 480 until there are no other interdependent resources to generate. After the executions of the called GenerateResource function and any GenerateResource functions subsequently called by the called function are complete, the current GenerateResource function proceeds to step 490. If there are no other interdependent resources in step 478, the function proceeds to step 482. In step 482, the function determines if the requested resource has been found. If the requested resource was not found, the function proceeds to step 484 where the CfgFound flag is set to false. If the requested resource was found in step 482, the function proceeds to step 486 where the CfgFound flag is set to true. From both steps 484 and 486, the function proceeds to step 488. In step 488, the function increments the working resource index. From step 488, the function proceeds to step 490.

In step 490, it is determined if there are other ranges for the current interdependent resource. If there are other ranges, the function proceeds to step 492 where the function removes the current interdependent resource and the interdependent resources after the current interdependent resource from the working configuration. From step 492, the function proceeds to step 494. In step 494, the GenerateResource function calls itself for the next range of the interdependent resource. In this way, each GenerateResource function called in step 494 continues to call itself at step 494 until there are no other ranges for the interdependent resource to generate. From step 494, the function proceeds to the Y connector in step 468.

In step 490 if there are no other ranges for the interdependent resource, the function proceeds to step 495. In step 495, the function determines if the current resource is the initial interdependent resource. If so, the function proceeds to the Y connector in step 468. Thus, the function has returned to the initial interdependent resource indicating that there are no additional interdependent resources to generate. If not, the function proceeds to step 496. In step 496, it is determined if a resource possibility remains. If not, the function proceeds to step 498 where an error signal is generated. From step 498, the function proceeds to a Y connector in step 468. From the Y connector of step 468, the function returns through step 466. If no resource possibilities remain, the function proceeds to step 500. In step 500, the function empties the working configuration of the previous resource possibilities of the current resource type. Next, the function proceeds to step 502 wherein the GenerateResource function calls itself for the next resource item possibility. In this way, the function called in sep 502 continues to call itself at step 502 until there are no other resource item possibilities to generate. Once execution of these recursive calls of the GenerateResource function is complete, the current GenerateResource function proceeds to the Y connector of step 468.

Thus, the GenerateResource function uses three-way recursion to generate a resource. The function continues to call itself to generate the next interdependent resource until no interdependent resources remain. In this way, dependencies between resources is fully taken into account in generating a resource for a device configuration. Second, if an interdependent resource has a range, the function continues to call itself to generate the range of an interdependent resource until no ranges remain. Third, the GenerateResource function continues to call itself to generate the next resource possibility until no resource possibilities of the current resource type remain.

From execution of the GenerateResource function in step 424, the GetConfig function proceeds to step 425, where it is determined if the GenerateResource function was successful. If it was not successful, the function proceeds through steps 416–418 wherein a configuration number is set and the function returns. If the GenerateResource function was successful, the GetConfig function proceeds to step 426. In step 426, the function determines if the working configuration has the current resource type. If so, the function loops back to step 414 where the function determines if all resource types have been evaluated. If not, the next resource type is fetched in step 420 and the GenerateResource function is called in step 424 if the resource type is included in the given configuration group. Thus, the Get Config function continues to loop through steps 414 and 420–426 until a resource is generated for each resource type included in the configuration group. If the working configuration does not have the current resource type, the function proceeds to step 428 and generates an error signal. From step 428, the function loops to step 416. From step 416, the GetConfig function returns to the FitMe function in step 418. Thus, the GetConfig function generates an initial working configuration to be stored in the configuration pattern.

From execution of the GetConfig function in step 312, the Fit-Me function proceeds to step 314 where it wild cards a resource out of the configuration pattern (FIG. 5A). Utilizing the configuration, the resource type index, and the current resource mask, Fit-Me calls the MakeWildcardedCfg function. The MakeWildcardedCfg function performs a wild card operation. In a wild card operation, the current resource in the configuration pattern is marked as a wild card by setting a flag. The current resource thereby becomes a "don't care" resource in the configuration pattern. As the current resource is wildcarded out of the configuration pattern, the configuration matching the configuration pattern need not match the current resource.

Next, in step 316, Fit-Me obtains the index of a matching configuration by calling a GetIndexofMatchingCfg function. The GetIndexofMatchingCfg function begins by retrieving the configuration pattern, the include mask, the exclude mask, and a configuration index representing the starting potential configuration. The function next pulls or generates a configuration corresponding to the starting configuration index to match to the configuration pattern. Once a potential configuration is selected, the function proceeds to check each resource type to verify a match with the configuration pattern.

The verification of the potential configuration selected by the GetIndexofMatchingCfg function proceeds a resource type at a time. For each verification, the function establishes the current resource type being evaluated. Next, the function loops through all resource items for the established resource type to verify the potential configuration matches the configuration pattern for the established resource type. The function verifies each resource item by first converting the resource index corresponding to the resource item into a mask for comparison to the configuration pattern. Before comparing the potential configuration to the configuration pattern, Fit-Me utilizes a SetResTypeOrder function to prioritize resource types for resource arbitration and a GetResTypeOrder function to fetch the prioritized resource types. The resource type to be evaluated is the resource type present in the potential configuration having the current priority.

Next, the GetIndexofMatchingCfg function generates an include mask for the current resource type and a exclude mask for the current resource type. If the selected resource type has the current priority, the include mask for the current resource type is set to the configuration include mask and the exclude mask for the current resource type is set the configuration exclude mask. Next, the function determines if the current resource of the selected resource type is wildcarded using the include mask for the current resource type. If so, there is a match for the current resource and the function selects the next resource type. If the current resource item of the selected resource item is not wildcarded, the function proceeds to evaluate each resource item from the potential configuration of the selected resource type.

Before examining the resource items, the function first checks if there are no resource items from the potential configuration of the selected resource type when there are resource items of the selected resource type in the configuration pattern. If so, a match is not possible for the selected resource type. If not, the function proceeds to evaluate each resource item of the selected resource type. In comparing each potential resource item with the configuration pattern if the current device needs for a particular resource item not to be included in the device configuration, the function uses the exclude mask of the selected resource type to identify the particular resource item. If that resource item matches the configuration pattern, the function disregards the selection of that resource item. If a match is found and the current resource item does not need to be excluded, the current configuration index corresponding to the matching configuration is stored as a matching configuration index. Thus, the GetIndexofMatchingCfg function controls the deterministic choice of a potential device configuration.

Figure 5H:
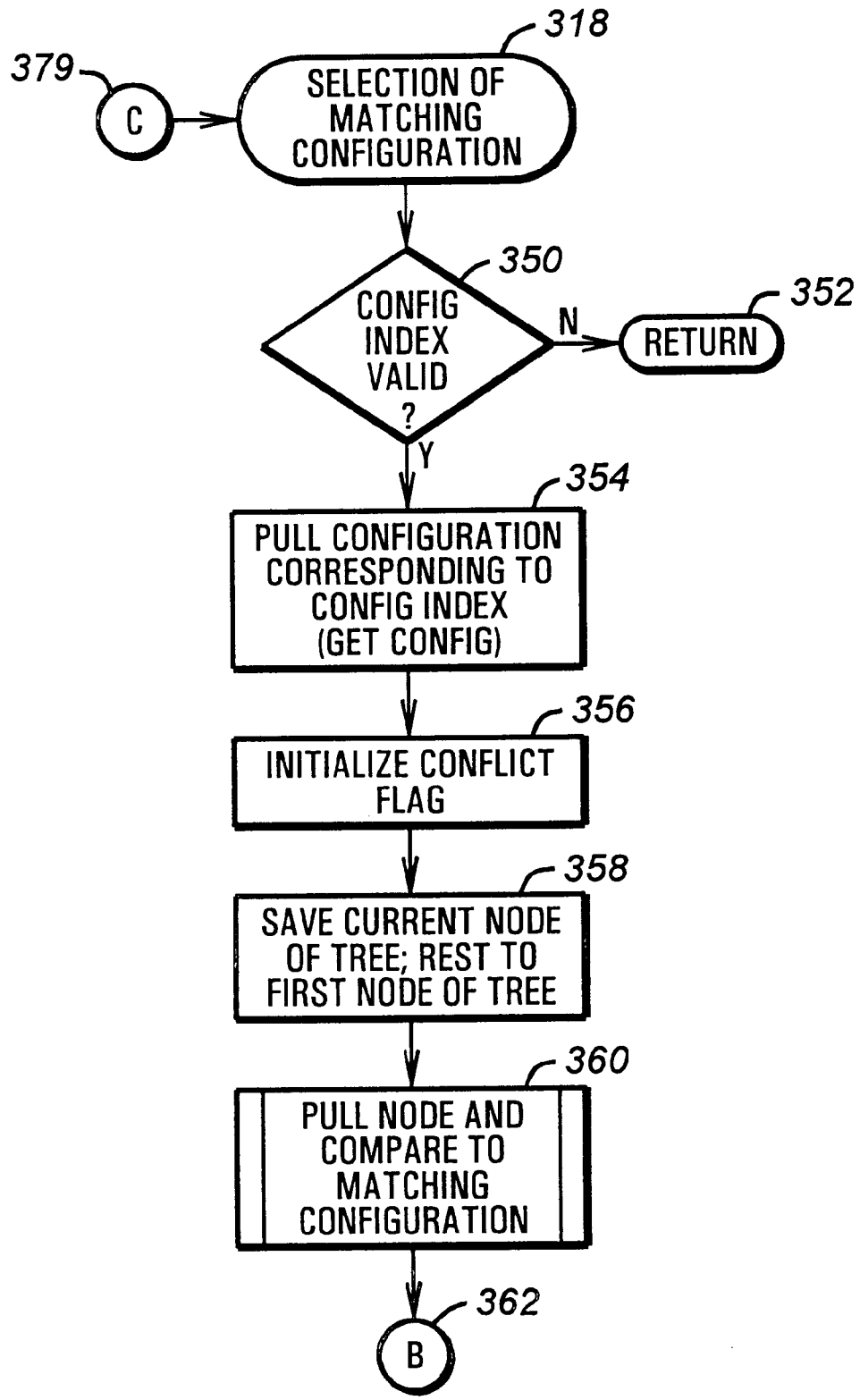
FIGS. 5H and 5I are a process for selecting matching configurations in accordance with the process of FIGS. 5A and 5B.
Figure 5I:
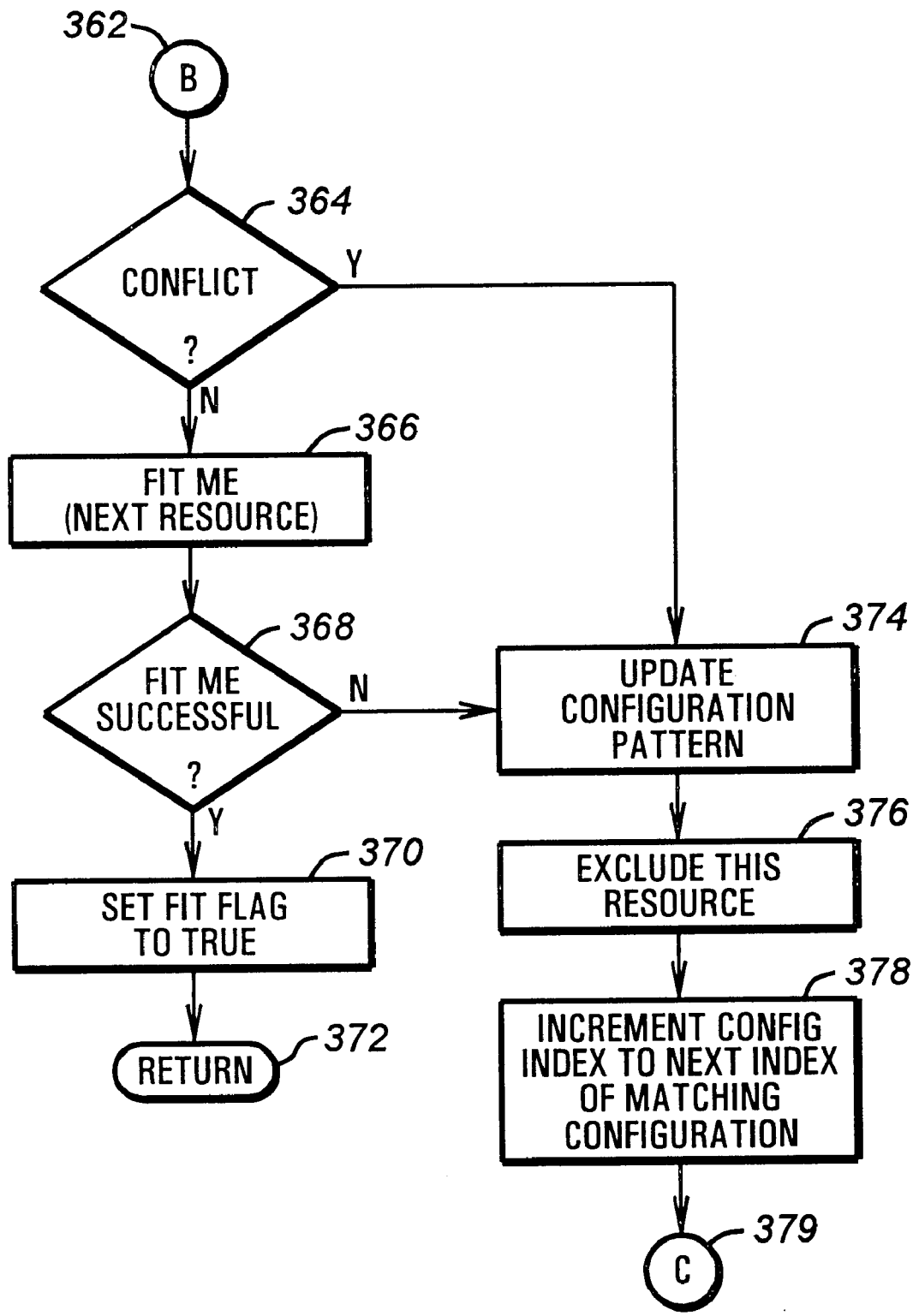

From step 316, the GetConfig function proceeds to step 318. In step 318, a matching configuration is selected. The process of selecting a matching configuration is shown in FIGS. 5H–5I. Turning to FIG. 5H, from step 318, the function proceeds to step 350 where it determines whether the matching configuration index is valid. If the matching configuration index is invalid, then the function returns through step 352. If the configuration index is valid, then the function proceeds to step 354 where it pulls the configuration corresponding to the matching configuration index.

In step 354, Fit-Me pulls a configuration by calling the GetConfig function. This function as described above retrieves a configuration corresponding to a configuration index. Next, in step 356 the conflict flag is initialized by setting the flag to false. From step 356, the function proceeds to step 358. In step 358, Fit-Me saves the current node device tree indices and resets the tree to its first node. The first node of the tree corresponds to the device in the least ordered position. After the tree is reset to the first node, the function in step 360 pulls a node and compares it to the matching configuration that was pulled in step 354. The steps for pulling a node from the tree and comparing the node to the matching configuration are shown in FIG. 5J.

Figure 5J:
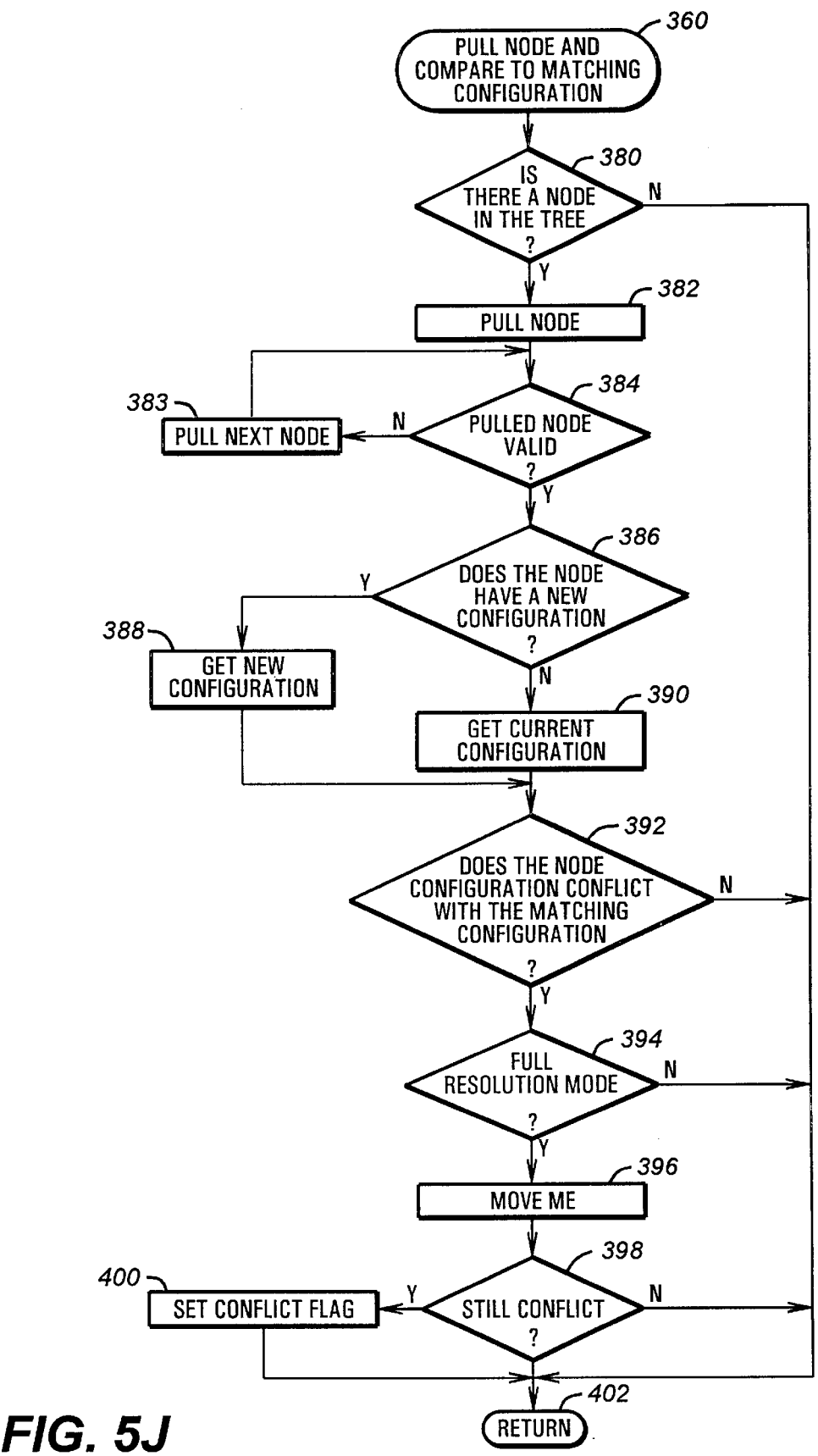
FIG. 5J is an illustration of a process for pulling nodes and comparing the nodes for matching configurations.

Turning to FIG. 5J, in step 380, the function determines whether there is a node in the device tree. If not, the function returns and exits through step 402. If there is a node in the tree, then the function pulls the node in step 382. Next, in step 384, it is determined whether the pulled node is valid by calling a number of functions. For example, the IsConfigurable function is called to determine whether the device can be configured; the IsDisabled function determines whether the device is disabled; and the UsesResources function determines whether a device node uses resources.

If the pulled node is invalid, then the Fit-Me function or method proceeds to step 383 where the next node is pulled. From step 383, the function loops back to step 384. If the pulled node is valid in step 384, then the function proceeds to step 386. In step 386, it is determined whether the node has a new configuration by calling a HasNewConfig function. If the node has anew configuration, then the function obtains the new configuration in step 388. Once the new configuration is obtained, the function proceeds to step 392. If the node does not have a new configuration, the function proceeds to step 390 where a current configuration is obtained. From step 390, the function proceeds to step 392.

In step 392, Fit-Me determines whether the pulled node configuration conflicts with the matching configuration by calling a DoesResConflict function. If there is not a conflict, then the function returns and exits through step 402. If there is a conflict, then the function proceeds to step 394 where it determines if the conflict resolution engine is in a full resolution mode. If the engine is in a full resolution mode, then the Fit-Me function calls the Move-Me function in step 396. The Move-Me function attempts to resolve the conflict by moving other device nodes which are not currently in the process of "fitting" or "moving." Details of the Move-Me function are provided below and in a concurrently filed application, entitled "Conflict Resolution Using Self-Contained 'Virtual' Devices," previously incorporated by reference. If the engine is not in full resolution mode, then the function returns through step 402.

From step 402, the function proceeds to a B connector at step 362 (FIG. 5H). Turning to FIG. 5I, the function proceeds from step 362 to step 364 where it determines if there is a conflict. If there is a conflict, the function updates the configuration pattern in step 374. Next, in step 376, the current resource which generated a conflict that cannot be resolved is mask excluded. The configuration exclude mask informs the Fit-Me function of which resources to avoid in pulling device configurations and is preferably updated by an OR operation between the configuration exclude mask and a mask representing the current resource. It should be understood that the configuration exclude mask may be implemented using other logical operations. After the current resource is mask excluded, the function proceeds to step 378 where it increments the configuration index to the next index of a matching configuration. Next, the function proceeds to a C connector at step 379. From the C connector, the function loops to step 318 for another selection of a matching configuration as described above.

If there is not a conflict in step 364, the function Fit-Me calls itself with the next resource in step 366. When there is not a next resource, the Fit-Me function after recursively calling itself for each resource proceeds to step 368. At step 368, the function determines if each call of the Fit-Me function was successful. If each recursive call was successful, then the function proceeds to step 370 where the FIT flag is set to true. From step 370, the function returns through step 372. If one of the Fit-Me calls was not successful, then the current Fit-Me function proceeds through steps 374–379 as described above.

After concluding the selection of matching configuration process at step 318, the function proceeds to an A connector at step 320 (FIG. 5A). From step 320, Fit-Me proceeds to step 322 where it marks the device node as not being configured (FIG. 5B). Next, the function proceeds to step 324 where it determines whether the device node is fit. If the device node is fit, the new configuration of the device is saved as the current configuration in step 326. From step 326, the function proceeds to step 328 where the new configuration is cleared by calling an UpdateAssignedConfigs function.

After step 328, the function proceeds to step 330 where it saves the new configurations of any devices which moved as a result of the current device. In step 330, the function identifies devices which are being configured by calling an IsInConfiguringMode function. If the device is not fit in step 324, the function proceeds to step 334 where it clears the new configuration by calling the UpdateAssignedConfigs function. Next, the function clears any new configurations resulting from the device in step 336. From steps 330 and 336, the function returns through step 332 ending the Fit-Me function.

Figure 6:
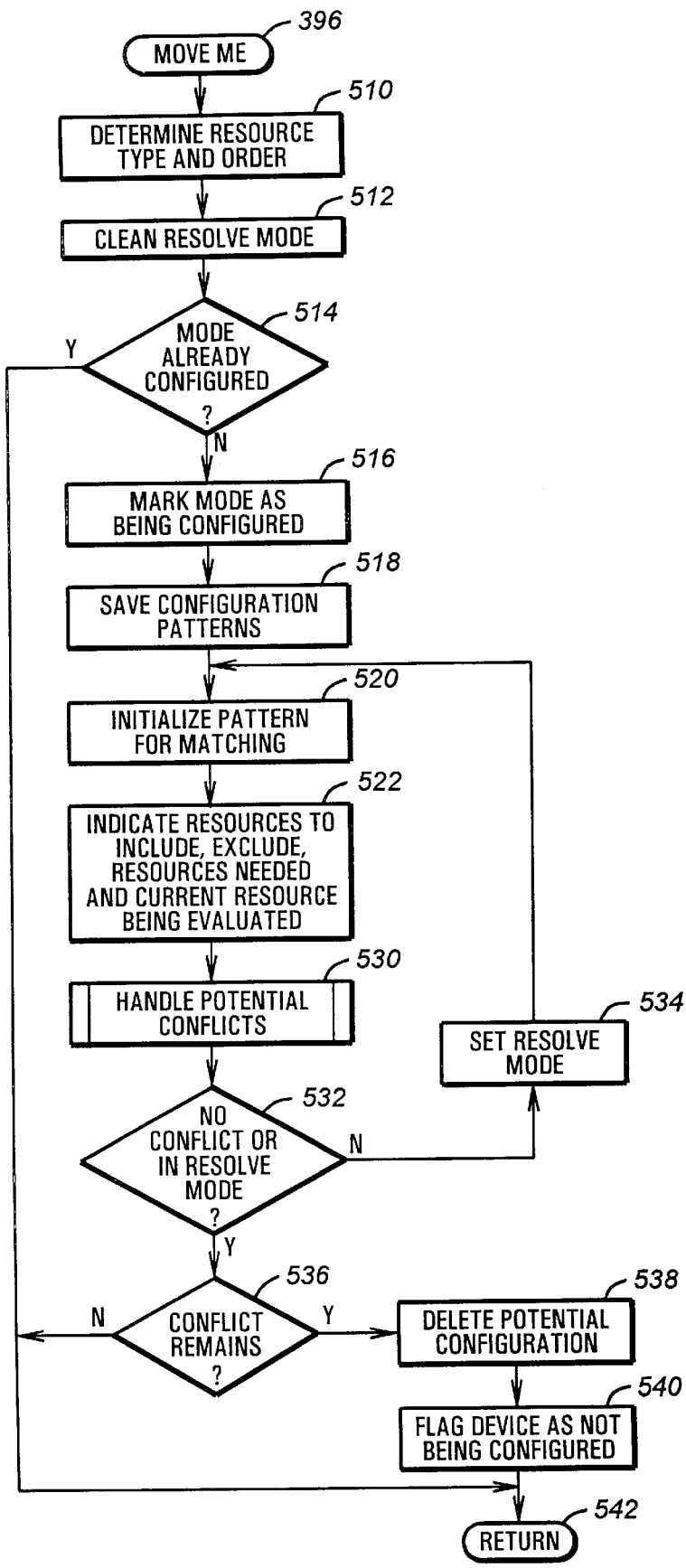
FIG. 6 is a flow chart of a MOVE_ME process for moving one device configuration to another device configuration.

Referring now to FIG. 6, the Move-Me process is illustrated in more detail. In FIG. 6, from step 396, the routine proceeds to step 510 where it determines the particular resource type and resource order. Next, in step 512, the routine of FIG. 6 clears a resolve mode flag. From step 512, the routine proceeds to step 514 where it checks whether the node representing the current device has already been configured. If so, the routine simply returns in step 542. Alternatively, in the event that the node has not been configured, the routine proceeds from step 514 to step 516 where it marks the node as being configured and further saves existing configuration patterns in step 518. From step 518, the routine proceeds to step 520 where it initializes the data structure for pattern matching and detection. From step 520, the routine then proceeds to step 522 where it indicates particular resources to include and exclude in a mask. Further, in step 522, it also indicates resources needed as well as the current resource being evaluated. From step 522, the routine proceeds to call a routine which handles potential conflicts in step 530. The handle potential conflicts routine is illustrated in more detail in FIG. 7.

From step 530, the routine then checks whether the newly added device encounters no conflict or whether it is in a resolve mode, indicating that it has encountered a conflict, in step 532. In the event of a conflict in step 532, the routine sets the process of FIG. 6 into a resolve mode in step 534. From step 534, the routine loops back to step 520 to continue the conflict resolution process for that particular device. Alternatively, while in step 532, in the event that no conflict is encountered or the system is not in the resolve mode, the routine of FIG. 6 proceeds to step 536 where it checks whether additional conflict remains. If so, the routine proceeds to step 538 where it deletes the potential configuration and flags the device as not being configured in step 540. From step 536 or step 540, the routine of FIG. 6 returns via step 542.

Figure 7:
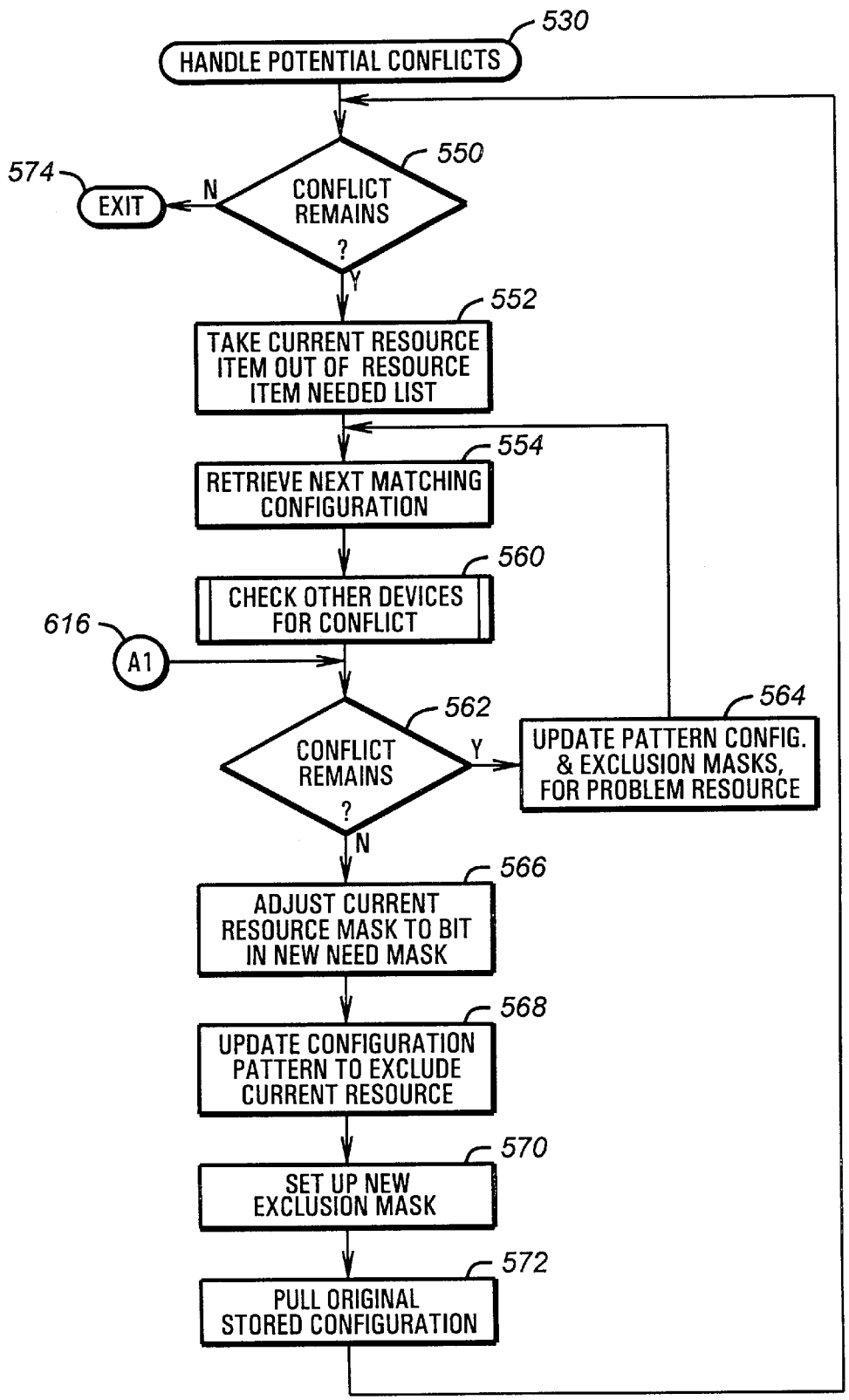
FIG. 7 is a process for handling potential conflicts in accordance with the process of FIG. 6.

Turning now to FIG. 7, the process for handling potential conflicts in step 530 in FIG. 6 is illustrated in more detail. In FIG. 7, from step 530, the routine checks whether configurational conflicts remain in step 550. If not, the routine simply returns in step 574. Alternatively, in the event of a conflict in step 550, the routine of FIG. 7 takes the current resource item out of the resource item needed list in step 552. Next, from step 552, the routine retrieves the next matching configuration in step 554. The routine then checks whether additional devices are in conflict in step 560, as illustrated in more detail in FIGS. 8 and 9. Upon returning from the routines of FIGS. 8 and 9, the process of FIG. 7 proceeds from step 560 to step 562 where it checks whether the conflict remains. If so, the pattern configuration and exclusion masks where the problem resources are updated in step 564 before the routine loops back to step 554.

Alternatively, in the event that no conflict remains in step 562, the routine of FIG. 7 adjusts the current resource mask to the bit and a new need mask in step 566. Furthermore, it updates the configuration pattern to exclude the current resource pattern in step 568 and sets up a new exclusion mask in step 570. From step 570, the routine of FIG. 7 pulls the original stored configuration in step 572 before it loops back to step 550 to continue handling the potential conflicts.

Figure 8:
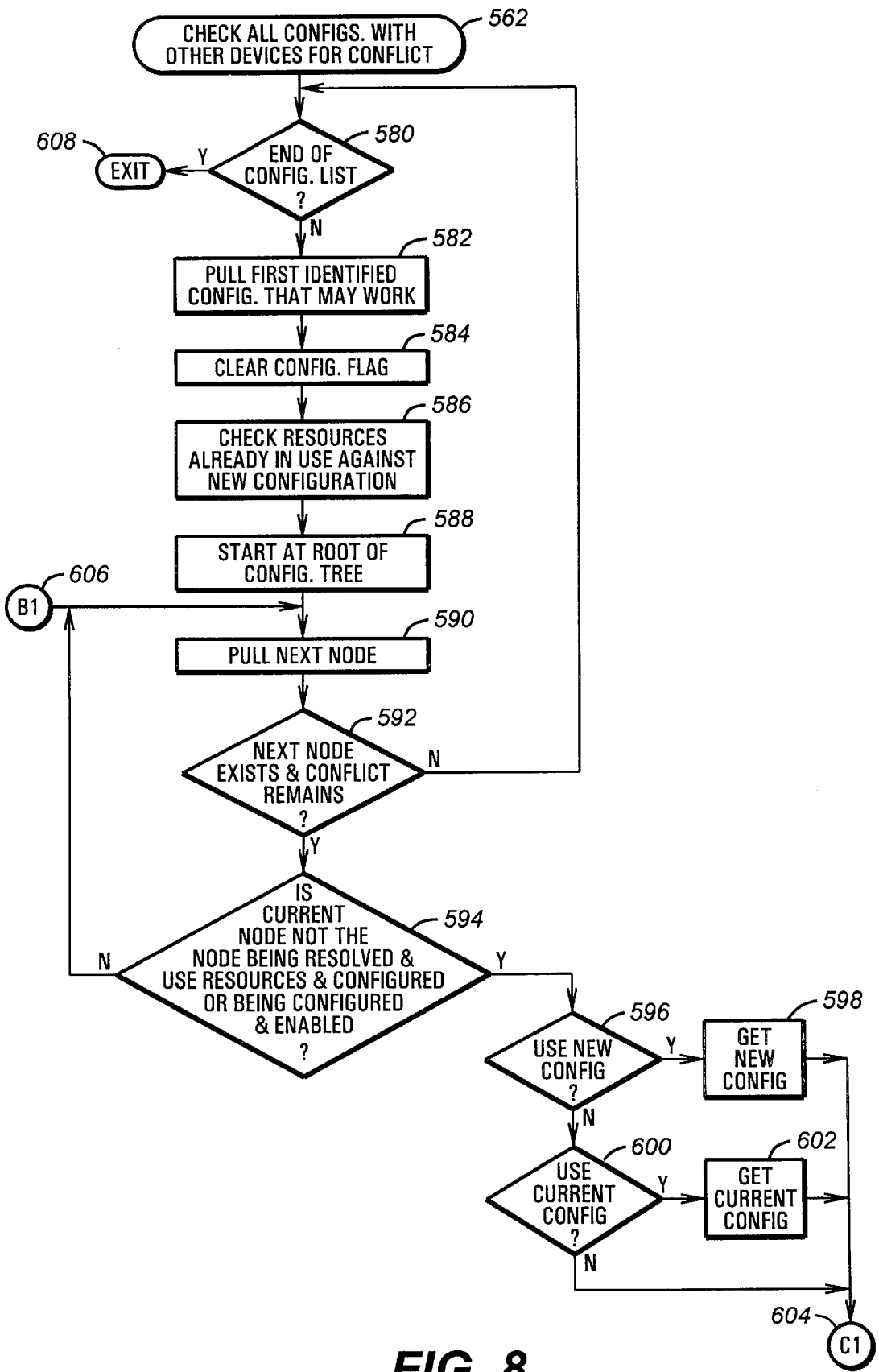
FIGS. 8 and 9 are flow charts illustrating the process for checking the configurations of other devices in accordance with the process of FIG. 7.

Referring now to FIG. 8, the routine to check the configurations of the remaining devices for conflicts is illustrated in detail. From step 562, the routine proceeds to step 580 where it checks for the end of the configuration list. If so, the routine proceeds from step 580 to step 608 to exit. Alternatively, in the event that other devices need to be configured, the routine proceeds from step 580 to step 582 where it pulls an identified configuration that potentially would not conflict with the next device in the configuration list. Next, from step 582, the routine proceeds to step 584 where it clears a conflict flag.

Furthermore, the routine proceeds to step 586 where it checks resources already in use against the new configuration. From step 586, the routine begins at the root of the configuration tree in step 588. From step 588, the routine pulls the next node in the configuration list in step 590. From step 590, the routine then checks if the next node exists and whether conflicts remain in step 592. If not, the routine loops back to step 580 to continue analyzing the devices in the configuration list. Alternatively, if the next node exists and conflict remains in step 592, the routine proceeds to step 594 where it checks whether the current node is not the node being resolved and whether the current node uses resources and whether it is being configured and whether the device represented by the node has been enabled in step 594. If not, the routine loops back from step 594 to step 590. Alternatively, in the event that the current node is the node being resolved, the routine proceeds from step 594 to step 596 where it checks whether or not a new configuration is to be utilized. If so, the new configuration is retrieved in step 598. Alternatively, in the event that the new configuration is not to be used, the routine proceeds from step 596 to step 600 where the routine of FIG. 8 further checks whether or not the current configuration is to be utilized. If so, the routine proceeds from step 600 to step 602 where the current configuration is retrieved. From steps 598, 600 or step 602, the routine of FIG. 8 proceeds to FIG. 9 via a connector C1 604.

Figure 9:
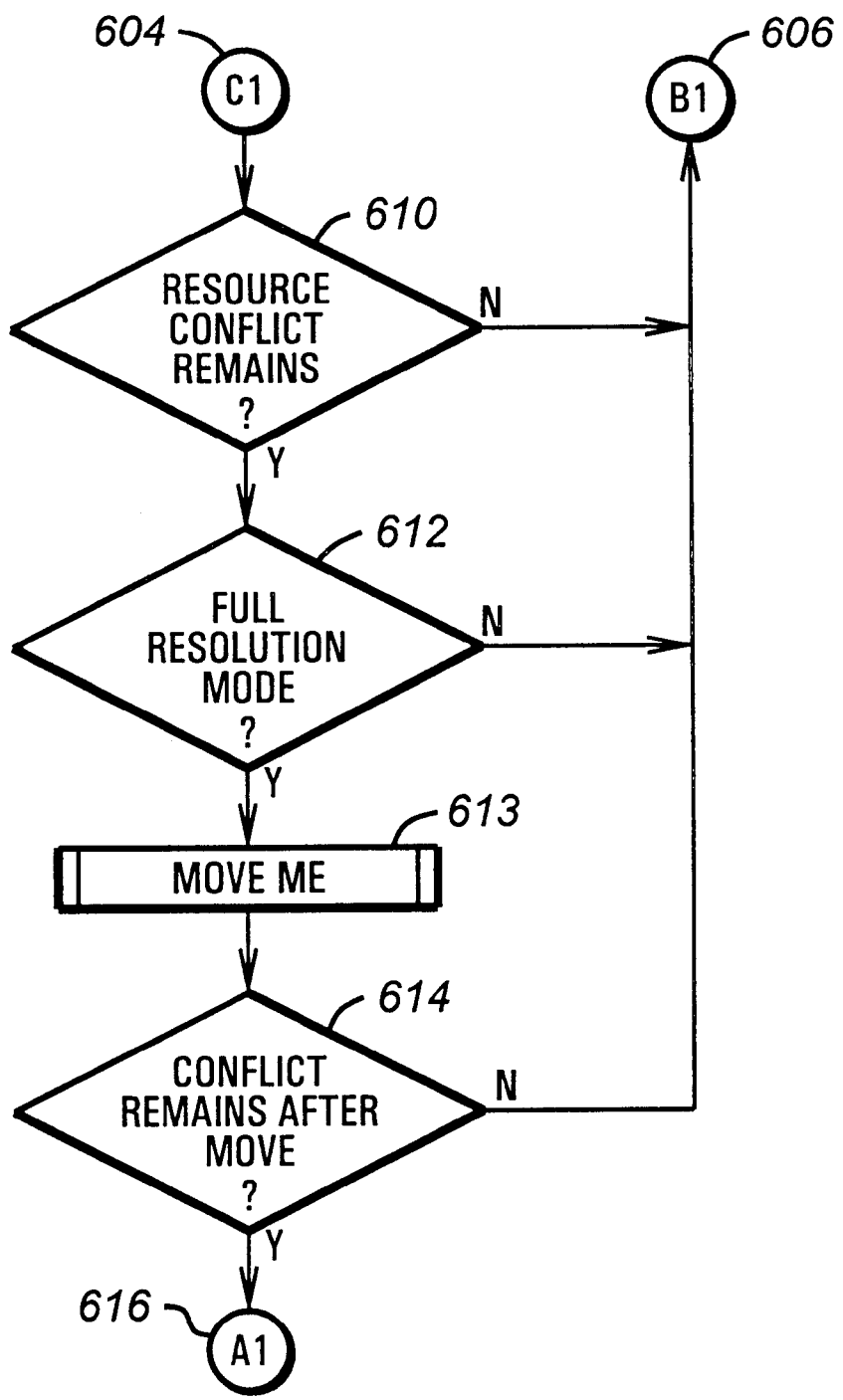

Turning now to FIG. 9, via the connector C1 604, the routine proceeds to step 610 where it checks whether or not resource conflicts remain. If not, the routine of FIG. 9 jumps back to step 590 of FIG. 8 via a B1 connector 606. Alternatively, in the event that the resource conflict exists in step 610, the routine proceeds to step 612 where it checks whether or not a fill resolution mode is to be performed. If not, the routine loops back to step 590 via the connector B1 606. Alternatively, in step 612, in the event that a full resolution mode is to be performed, the routine of FIG. 9 recursively performs the Move Me operation in step 613. Because step 693 is a recursive operation, the routine of FIG. 9 then jumps back to step 396 of FIG. 6 where it continues recursively executing the Move Me process. Upon returning from the recursive call to Move-Me in step 613, the routine of FIG. 9 proceeds to step 614 where it checks whether the conflict remains after the Move-Me operation. If not, the routine proceeds back to FIG. 8 via the connector B1 606. Alternatively, if a conflict remains, the routine of FIG. 9 jumps back to step 562 via an A1 connector 616.

Figure 10:
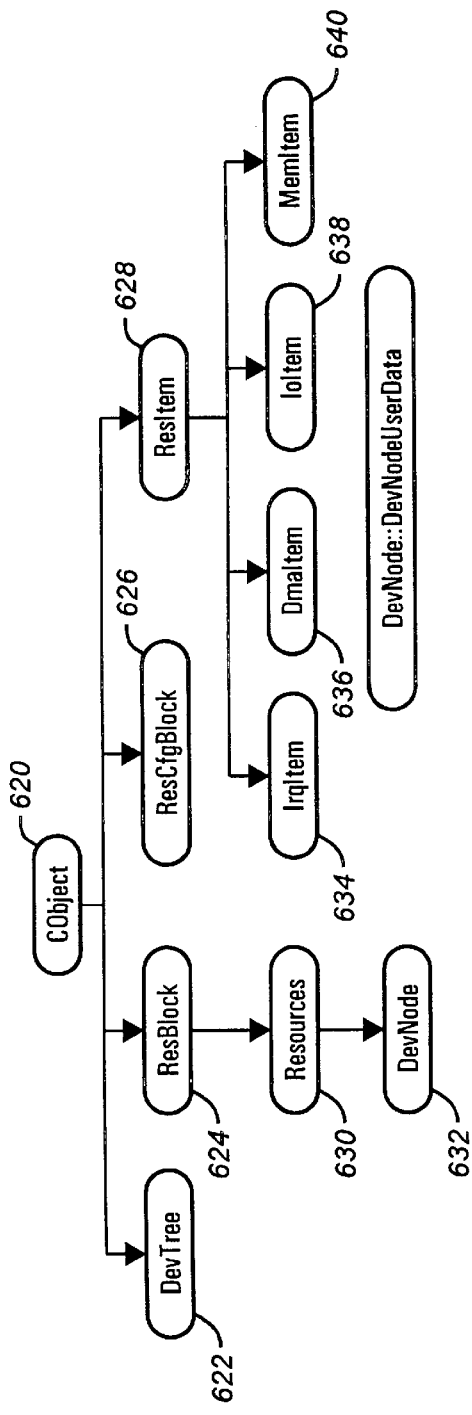
FIG. 10 is a diagram illustrating device node inheritance hierarchy in the process of the present invention.

Referring now to FIG. 10, a device node inheritance hierarchy is illustrated. The inheritance hierarchy is used in the preferred object-oriented programming (OOP) paradigm. Approaches to programming have changed dramatically since the invention of the computer, primarily to accommodate the increasing complexity of programs. Object-oriented programming has taken the best ideas of structured programming and combined them with several powerful new concepts, among them the decomposition of the problem into sub-groups of related parts which include both the code and data related to each group. Further, the subgroups are organized into a hierarchical structure. These hierarchical structures are translated into self-contained units called objects. Put simply, an object is a logical entity that contains both data and code that manipulates set data. Within an object, some of the code and/or data may be private to that object and inaccessible to anything outside the object. In this way, an object provides a significant level of protection against some other, unrelated part of the program from accidentally modifying or destroying the private parts of the object. This linkage of code and data is often referred to as encapsulation. Typically a program calls an object's member functions to tell the object to do something. Thus, the calling of an object's member function is also known as "sending a message" to the object. In this way an object provides a significant level of protection against some other, unrelated part of the program from accidentally modifying while incorrectly using the private parts of the object.

Overlaying objects are classes. A class is similar syntactically to a structure. A class may contain private as well as public parts. As a class creates a new data type that may be used to create objects of that type, an object is simply an instance of a class in the same way that some other variable is an instance of a particular data type such as integer (INT). Put differently, a class is a logical abstraction while an object is real in that it exists inside the computer's memory.

Against this background, inheritance is the process by which one object can acquire the properties of another object. This is important because it supports the concept of classification. Without the use of classifications, each object would have to define explicitly all of its characteristics. However, through the use of classifications, an object needs only define those qualities that make it unique within its class. It is the inheritance mechanism that makes it possible for one object to be a specific instance of a more general case. In the preferred embodiment using a C++ language, inheritance is supported by allowing one class to incorporate another class into its declaration. Inheritance allows a hierarchy of classes to be built, moving from the most general to the most specific. First, a base class is created which defines qualities common to all objects to be derived from the base. Thus, the base class represents the most general description. The classes derived from the base are usually referred to as derived classes. A derived class includes all features of the generic base class and then adds qualities specific to the derived classes.

Returning now to FIG. 10, the object 620 has a plurality of classes DevTree 622, Res Block 624, ResCfgBlock 626 and ResItem 628. From the base class ResBlock 624, a Resources class 630 adds additional details to that of ResBlock 624. Further, a DevNode class 632 contains even more details specific to the node from the Resources class 630. Additionally, the resource item ResItem 628 has a plurality of derived base classes IrqItem 634, DmaItem 636, IoItem 638 and MemoryItem 640. These items delineate the type of resources to be resolved for each device. In FIG. 10, a "::" symbol, known as a scope resolution operator, tells the compiler that DevNodeUserData belongs to a class called DevNode.

Figure 11:
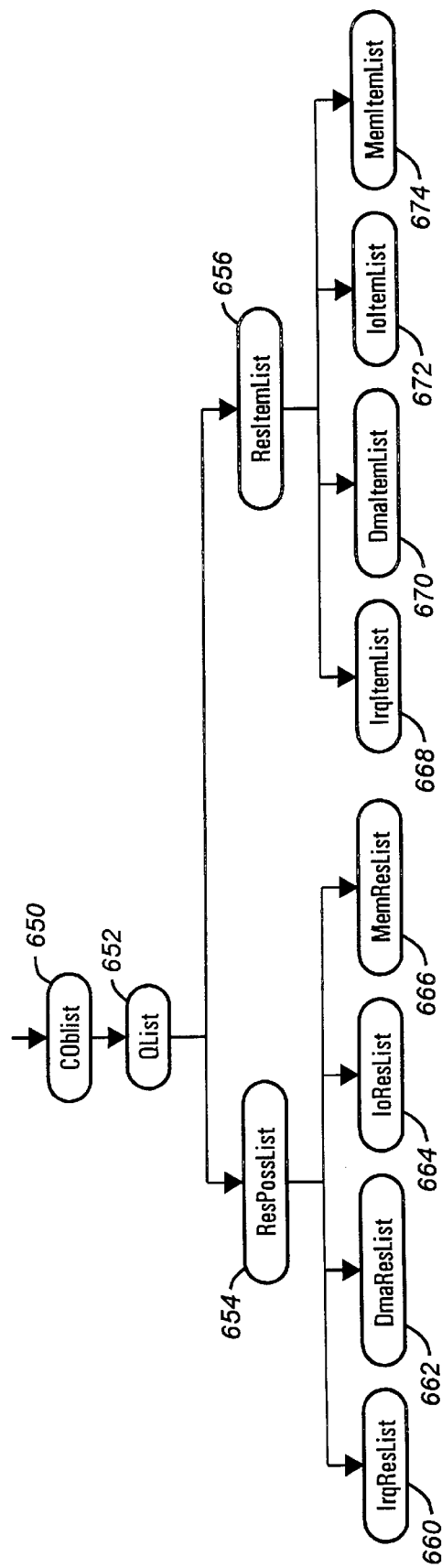
FIG. 11 is a diagram illustrating a resource list inheritance hierarchy in accordance with the present invention.

Turning now to FIG. 11, a resource list inheritance hierarchy is illustrated. In FIG. 11, a queue list Qlist 652 inherits traits from a C object list CObList 650, which is derived from a Microsoft Foundation Class (MFC) CObList. In turn, a class resource possibility list ResPossList 654 and a resource item list ResItemList 656 depends from the queue list 652. Furthermore, an interrupt request list IrqResList 660, a DMA resource list DmaResList 662, an I/O resource list IOResList 664 and a memory resource list MemResList 666 in turn depends from the hierarchy of the resource possibility list ResPossList 654. Similarly, an interrupt item list IrqItemList 668, a DMA item list DmaItemList 670, an I/O item list IoItemList 672 and memory item list MemItemList 674 in turn derived from the base class resource item list ResItemList 656. Specific details on the inheritance hierarchy of FIGS. 9 and 10 are provided in the code in the attached Appendix A.

Figure 12:
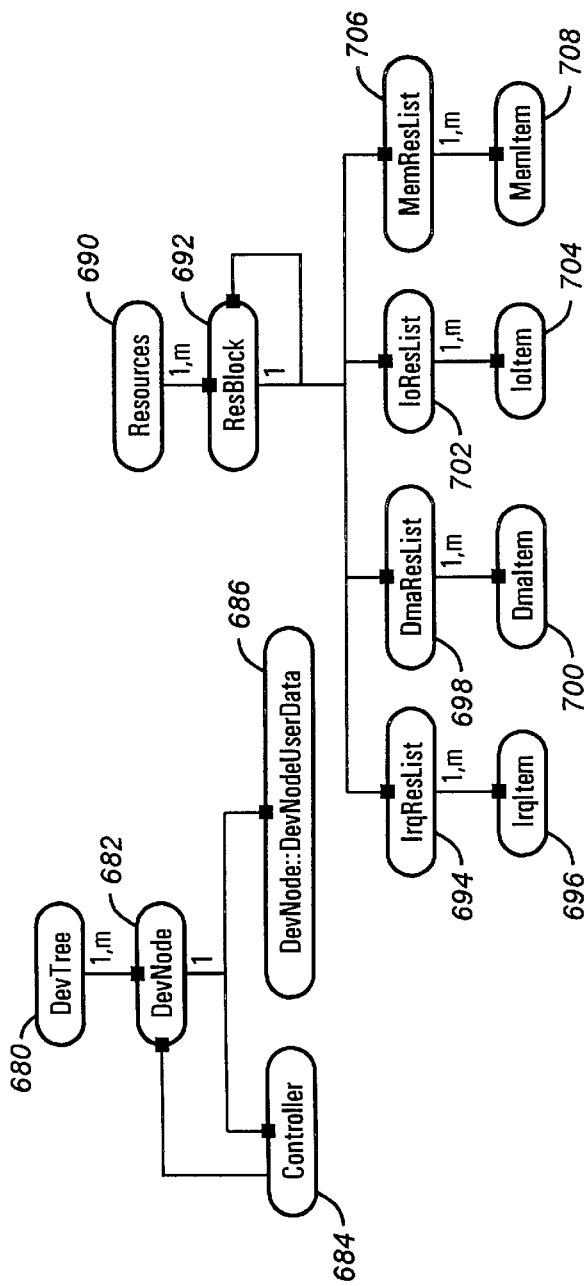
FIG. 12 is a diagram illustrating the containment of DEV NODE in accordance with the present invention.
Figure 13:
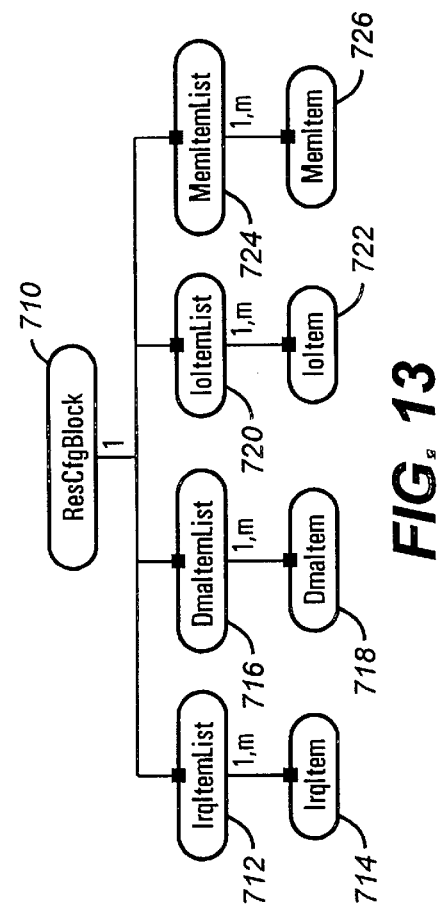
FIG. 13 is a diagram illustrating a resource configuration containment in accordance with the present invention.

Turning now to FIGS. 12 and 13, the containment diagrams for DevNode and Resources diagrams are illustrated in detail. As used herein, a container is a way to store data, whether the data consists of built-in types such as integer and float or of class objects. Referring now to FIG. 12, the containment diagram for DevNode is illustrated. A controller class 684 and a DevNode:: DevNodeUserData 686 is contained in a DevNode class 682. Further, one or more of the DevNode classes 682 are contained in a DevTree class 680.

The containment relating to the resources group 690 is also shown in FIG. 12. One or more interrupt items (IRQ) items 696 is contained within an interrupt resource list IrqResList 694. Similarly, one or more DMA items 700 are contained within a DMA resource list DmaResList 698. Additionally, one or more I/O items 704 are contained within an I/O resource list IoResList 702. Finally, one or more memory items 708 are contained in a memory resource list MemResList 706. The IrqRes list 694, DmaResList 698, IoResList 702 and MemResList 706 in turn are contained within a resource block ResBlock 692. One or more resource blocks 692 in turn are contained within the resources category Resources 690.

Turning now to FIG. 13, the containment diagram for resource configuration block ResCfgBlock 710 is shown. Similar to that of FIG. 12, one or more interrupt request items IrqItem 714 is contained within an interrupt request item list IrqItemList 712. Further, one or more DmaItems 718 are contained within a DMA item list DmaItemList 716. Similarly, one or more I/O items IoItem 722 are contained within an I/O item list IoItemList 720. Last but not least, one or more memory items 726 are contained within MemItemList 724. Collectively, the IrqItemList 712, DmaItemList 716, IoItemList 720 and memory item list MemItemList 724 are contained within a resource configuration block RescfgBlock 710.

For more details, the inheritance hierarchy of FIGS. 9 and 10, as well as the containment diagrams of FIGS. 12 and 13 are shown in the code of the attached Appendix A.

Referring now to FIG. 14, a simplified illustration of communications between objects representative of devices A, B and C are shown. For illustrative purposes, communications by the devices A through C have been grouped into states 740–752. In FIG. 14, a device stack represents the current configuration of devices A–C. Initially, in state 740, devices A and B are marked on the device stack as already configured while the device C is marked as being unconfigured on the device stack. In this hypothetical example, Device C sends a message to itself and invokes the Fit-Me function in state 742. For illustrative purposes, Fit-Me fails and the Device C is unable to find an alternate configuration.

From state 742, Device C, which for illustrative purpose has only one configuration, enters the full conflict resolution mode in state 744. In the full conflict resolution mode, Device C sends a DoesResConflict message to Device A to ask whether the resources desired by the device C is in conflict with resources of Device A. In the example of FIG. 14, Device A in turn replies that the proposed configuration for the Device C is not in conflict. At this point, the object representative of the device C sends the same message to the object representative of the device B, namely whether or not a conflict exists with device B. For illustrative purpose, the requested resource is in conflict with device B and thus the object representative of device B at this point replies that a conflict exists.

At this stage, Device C sends a message to itself and invokes the Fit-Me function (but this time from the full resolution mode) in state 744. For illustrative purposes, Fit-Me fails and the Device C is unable to find an alternate configuration. Device C next sends a DoesResConflict message to Device A to ask whether the resources desired by the device C is in conflict with resources of Device A. In the example of FIG. 14, Device A in turn replies that the proposed configuration for the Device C is not in conflict. At this point, the object representative of the device C sends the same message to the object representative of the device B, namely whether or not a conflict exists with device B. For illustrative purpose, the requested resource is in conflict with device B and thus the object representative of device B at this point replies that a conflict exists. Device C at this point sends a Move-Me message to request Device B move from its existing configuration.

As illustrated in state 744, devices A and B are marked as configured. Further, the device B is also marked as being configured in the Move-Me message. Meanwhile, the device C is still marked as being configured via the Fit-Me request.

In state 746, to simplify discussion, Device B has a second configuration possibility to try and thus Device B sends a DoesResConflict message to the Device A which requests whether or not Device A is in conflict with a proposed configuration for Device B. In this hypothetical example, Device A responds affirmatively that a conflict exists. Next, Device B then sends a Move-Me message to Device A, which requests that the Device A moves to another configuration. At this stage, Device A is noted as configured as well as being configured via the Move-Me message. Device B is marked as configured and also as being configured by the Move-Me message. Finally, the device C is marked as being configured via the Fit-Me request. Now, the system of FIG. 14 transitions to state 748.

In state 748, for illustrative purposes, the Device A has a second configuration and locates non-conflicting resources in the second configuration. As such, the device A sends a success reply (NO CONFLICT) to Device B and Device C in state 748. A's success in locating an acceptable resource configuration causes the device stack to transition from state 748 to state 750 where, upon receipt of the success signal from A, B takes resources previously assigned to the device A and further reports back that it has successfully located non-conflicting resources. B in turn sends a signal to C, causing it to transition from state 750 to state 752. Devices A, B and C are then marked as configured and the respective "being-configured" flags of Fit-Me and Move-Me are negatively asserted in the device stack in step 752. In this manner, FIG. 14 illustrates the communication process amongst objects representative of devices A, B and C.

FIGS. 15, 16a–16b, 17a–17b, 18a–18b and 19a–19b illustrate in more detail the process for performing conflict resolution in the present invention. For the purpose of this example, the following assumptions are made: (1) there are no devices in the system when the conflict resolution process begins; (2) the devices support only interrupt request lines (IRQ lines) and direct memory access (DMA) channels as independent resources; (3) IRQ designations are assumed to have the highest priority while DMA designations are assumed to be the lowest priority items.

Furthermore, for purposes of illustration, the resources are represented by numbers and not by structures as is performed by the preferred embodiment. Additionally, for ease of illustration, the resources will be represented by a matrix and not by a tree as is performed by the preferred embodiment. In the example, device A supports interrupt request lines IRQ line 1, IRQ line 2, IRQ line 3 and IRQ line 4, as well as DMA channels DMA channel 12, DMA channel 14 and DMA channel 16. Device B supports IRQ line 1 and IRQ line 2 as well as DMA channel 12, DMA channel 14, DMA channel 16 and DMA channel 18. Device C in turn supports IRQ lines 1 and 2, as well as DMA channels 12 and 14, while device D supports IRQ line 1, IRQ line 2, IRQ line 3 and only DMA channel 12. In this example, the devices will be added one at a time to the computer system of FIG. 1A in the order A, B, C and then D. As shown below, each device is fully configured before the next device is added.

FIGS. 15, 16a–16b, 17a–17b, 18a–18b and 19a–19b illustrate the operation of the conflict resolution engine (CRE) when four devices A–D are added to the system. In this example, DEVICE A supports IRQ lines 1, 2, 3, 4 and DMA channels 12, 14, 16; DEVICE B supports IRQ lines 1, 2, and DMA channels 12, 14, 16, 18; DEVICE C supports IRQ lines 1, 2 and DMA channels 12, 14; and DEVICE D supports IRQ lines 1, 2, 3 and DMA channel 12.

Figures 15, 16A, 16B:
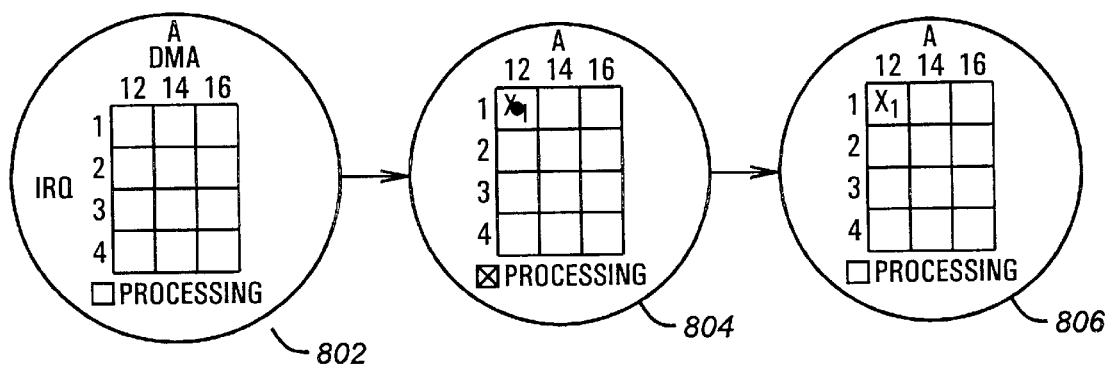
FIG. 15 is a scoreboard for a second example of the resource conflict resolution process in accordance with the present invention.
FIGS. 16a–16b are illustrations of the addition of a first device to the computer system of FIG. 1 and its effect on the scoreboard FIG. 15.

Turning now to FIG. 15, a scoreboard illustrating relevant resources available in the computer system is shown. The scoreboard FIG. 15 is represented as a 4×4 matrix representative of IRQ line 1 through IRQ line 4 and DMA channels 12–18. As the devices are inserted into the computer system, the relevant interrupt request line and the DMA channel will be checked off to represent usage.

Turning now to FIGS. 16a–16b, the addition of a device A is illustrated. In FIGS. 16a–16b, the state of the device A is illustrated as contained within a circle 802. When Device A is added to an empty system, it is obvious that there will be no conflict. Thus, from state 802, Device A is flagged as processing a re-configuration in state 804. Device A is asked for its first configuration matching a pattern containing all wild cards. In accordance with the present invention, resources are handled one at a time in the order of IRQ lines then DMA channels as IRQ lines have been designated as higher priority items.

The first resource combination returned is IRQ line 1, DMA channel 12 (the top left box of Device A). As there are no conflicts with other devices, Device A now "owns" IRQ line 1. The pattern is updated with IRQ line 1. The next possible configuration matching the pattern is retrieved. It is still IRQ line 1, DMA channel 12 but now the availability of the DMA channel is tested. As there are no conflicts with other devices, Device A now "owns" DMA channel 12. Further, since there are no more resources to consider, Device A has successfully configured and resets it configuration flag in state 806. Device A's resources look as follows ($X_1$ denotes the first configuration of the device):

| | Device A | | |
| --- | --- | --- | --- |
| | DMA | | |
| IRQ | 12 | 14 | 16 |
| 1 | $X_1$ | | |
| 2 | | | |
| 3 | | | |
| 4 | | | |

Further, the scoreboard of FIGS. 16a–16b reflects the mapping of Device A to occupy IRQ line 1 and DMA channel 12.

Figures 17A, 17B:
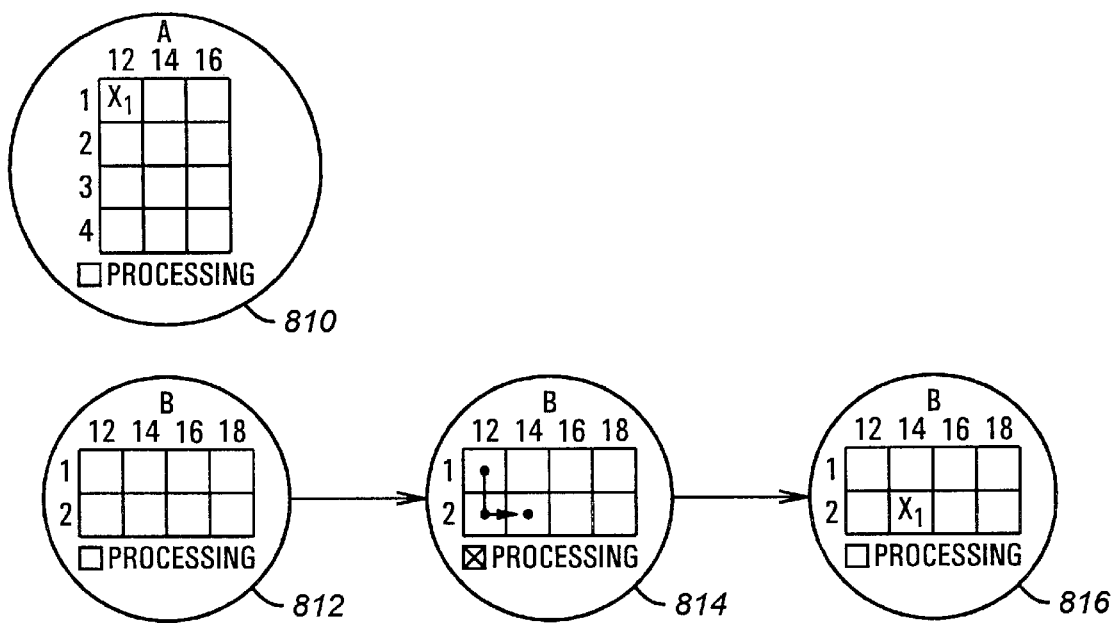
FIGS. 17a–17b illustrates the addition of a second device to the computer system of FIG. 1 and its effect on the scoreboard FIG. 15.

The addition of a Device B to the computer system S with installed Device A will be illustrated in FIGS. 17a–17b. FIG. 17 illustrates the configuration for device A in state 810, as well as the uninitialized configuration of device B in state 812.

Upon detecting the insertion of Device B, the conflict resolution system of the present invention first attempts to find a conflict-free configuration. In this mode, Device B is flagged as processing a re-configuration in state 814. The Device B is next asked for its first configuration matching a pattern containing all wild cards. The first resource combination returned is IRQ line 1, DMA 12 (the top left box of Device B). However, a conflict exists as the Device A owns IRQ line 1 which cannot, at the moment, be used by Device B. Device B will try to find a conflict-free configuration before it asks other devices to move.

The matching pattern is updated with IRQ line 1. The exclude mask is changed to indicate a "negation" of the conflicting IRQ line given in the pattern. The next possible configuration matching the pattern is retrieved. It is IRQ line 2, DMA channel 12. As IRQ line 2 is available, Device B now "owns" IRQ line 2.

The pattern is updated with IRQ line 2 and the exclude mask is reset. The next possible configuration matching the pattern is retrieved. It is still IRQ line 2, DMA channel 12 but now the DMA channels are analyzed. There is a conflict with another device, as the Device A owns DMA channel 12 which cannot, at the moment, be used by Device B. Device B will try to find a conflict-free configuration before it asks other devices to move. The pattern is updated with DMA channel 12. The exclude mask is changed to indicate an "inclusion" of the IRQ line and a "negation" of the conflicting DMA channel given in the pattern.

The conflict resolution engine (CRE) then asks for the next resource combination that has IRQ line 2 and NOT DMA channel 12. The next possible configuration matching the pattern is retrieved. It is IRQ line 2, DMA channel 14. The DMA channel 14 is available and thus Device B reserves or "owns" DMA channel 14. At this point, Device B has successfully configured itself. Thus, Device B is flagged as not processing a configuration in state 816 and the Device B's resources appear as follows:

| | Device A | | |
| --- | --- | --- | --- |
| | DMA | | |
| IRQ | 12 | 14 | 16 |
| 1 | $X_1$ | | |
| 2 | | | |
| 3 | | | |
| 4 | | | |

| | Device B | | | |
| --- | --- | --- | --- | --- |
| | DMA | | | |
| IRQ | 12 | 14 | 16 | 18 |
| 1 | | | | |
| 2 | | $X_1$ | | |

Further, the scoreboard of FIGS. 16a–16b reflects the mapping of Device A to occupy IRQ line 1 and DMA channel 12 and Device B to IRQ line 2 and DMA channel 14.

Figures 18A, 18B:
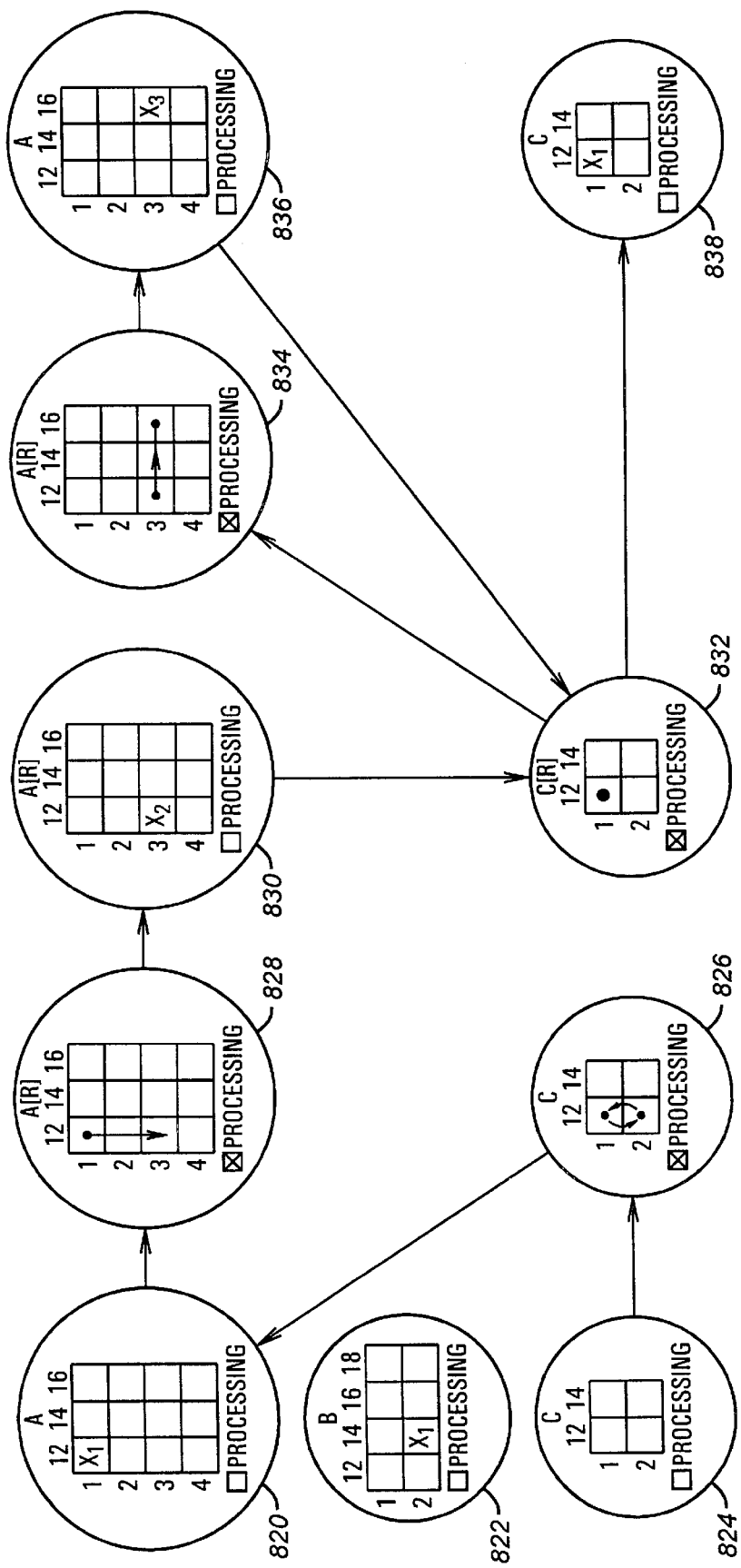
FIGS. 18a–18b are illustrations of the addition of a third device to the computer system of FIG. 1 and its effect on the scoreboard FIG. 15.
Figures 19A, 19B:
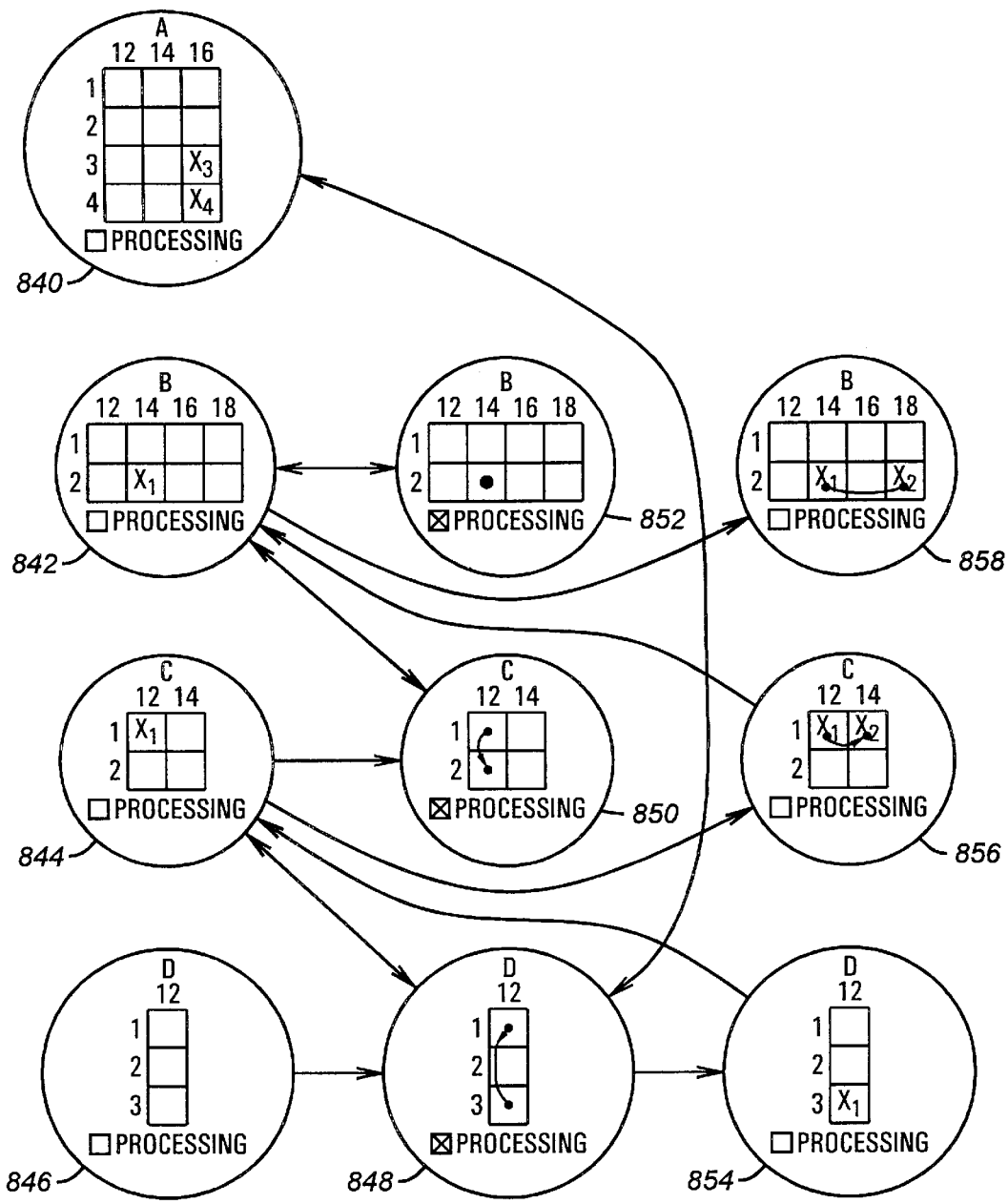
FIGS. 19a–19b are diagrams illustrating the effects of the addition of a fourth device to the computer system of FIG. 1 and its impact on the scoreboard of FIG. 15 in resolving resource conflicts.

Turning now to FIGS. 18a–18b, the addition of a Device C is shown. In FIGS. 18a–18b, the configuration of existing Device A is shown in state 820, while the configuration of existing Device B is shown in state 822. The uninitialized configuration of Device C is shown in state 824.

From state 824, the CRE attempts to find a conflict free configuration. In this mode, Device C is flagged as processing a configuration in state 826. When Device C is added to the system, it is asked for its first configuration matching a pattern containing all wild cards. The first resource combination returned at this stage is IRQ line 1, DMA channel 12 (the top left box of Device C). However, there are conflicts with other devices: Device A owns IRQ line 1 which cannot, at the moment, be used by Device C. Hence, Device C will try to find a conflict-free configuration before it asks other devices to move.

Next, the pattern is updated with IRQ line 1. The exclude mask is changed to indicate a "negation" of the conflicting IRQ line given in the pattern. The next possible configuration matching the current pattern is retrieved. It is IRQ line 2, DMA channel 12. However, a conflict still exists with Device B which is using IRQ line 12. As Device C cannot use IRQ line 2, the pattern is updated with IRQ line 2. The exclude indicates a "negation" of the conflicting IRQ line given in the pattern. The next possible configuration matching the current pattern is requested. There are no more configurations that can be returned. As such, possible IRQ line values for Device C have been exhausted. This is the first device in the example that cannot use one of its possible resource combinations without conflicting with other devices in the system.

Here, Device C has already tried (and failed) to configure without asking any other devices to move off of their current resources. Device C next goes through all of its configurations again in the same manner, this time asking the conflicting Devices to move. At this point, Device C retrieves its first resource combination again: IRQ line 1, DMA channel 12. However, there are conflicts with other devices: Device A owns IRQ line 1. Thus, in state 826, Device C requests that Device A move off of IRQ line 1 which is Device A's current IRQ line.

Device A transitions from state 820 to state 828 and is now the focus of the system. If it can move, Device C may use IRQ line 1. If it fails to move, Device C must use another IRQ line. In attempting to move, Device A will repeat the process of fitting into the system as if it were just added with the exception that it will avoid IRQ line 1. During this process, Device A may ask other Devices to move which may, in turn, ask Device A to move. To avoid infinite repetitions of devices moving and make the system get smaller, Device A (or any device that is being configured) must flag itself as being in the process of being re-configured. Devices marked with re-configuration flag raised are not permitted to change their configurations, thus allowing the CRE to converge on a solution if one is available or to fail where none exists.

Device A, which is currently configured to use IRQ line 1, DMA channel 12, updates its pattern with IRQ line 1, DMA channel 12 and sets its exclude mask to indicate a change in the IRQ line. Device A now looks for a configuration that is NOT IRQ line 1, and DMA channel 12 in an attempt to move off its current IRQ line resource. No attempt is made to move the DMA channel resource since it does not yet conflict. The next possible configuration matching the pattern is retrieved. It is IRQ line 2, DMA channel 12. However, there is a conflict with Device B. Since Device A is not in resolve mode (it tries to fit in the system without disturbing other devices) Device A obtains the next matching resource combination: IRQ line 3, DMA channel 12. As IRQ line 3 is unused, Device A now owns it. Thus, from state 820, Device A has moved from IRQ line 1, DMA channel 12 to IRQ line 3, DMA channel 12 in state 828. These new values are saved as Device A's potential configuration. Now, when Device A's resources are checked, Device A will report its potential configuration. Since Device A successfully moved off of IRQ line 1, its configuring flag is reset in state 830 and a success code is passed back to the calling device, Device C, which is now free to use IRQ line 1. Having no more resources to consider after Device A's successful move operation, Device C is free to take IRQ line 1 and is temporarily flagged as not processing a configuration. The device resources at this stage appear as follows.

| | Device A DMA | | |
|---|---|---|---|
| IRQ | 12 | 14 | 16 |
| 1 | $X_1$ | | |
| 2 | | | |
| 3 | | $X_2$ | |
| 4 | | | |

| | Device B DMA | | | |
|---|---|---|---|---|
| IRQ | 12 | 14 | 16 | 18 |
| 1 | | | | |
| 2 | | $X_1$ | | |

| | Device C[R] DMA | |
|---|---|---|
| IRQ | 12 | 14 |
| 1 | | |
| 2 | | | line 3, DMA channel 12, will update its pattern with IRQ line 3, DMA channel 12 and set its exclude mask to indicate that it would like to change the DMA channel. Device A now looks for a configuration that is IRQ line 3, and NOT DMA channel 12 in an attempt to move off its current DMA channel resource. The next possible configuration matching the pattern is retrieved. It is IRQ line 3, DMA channel 14. However, there is a conflict with Device B.

Since Device A is not in resolve mode (it tries to fit in the system without disturbing other devices) it gets the next matching resource. IRQ line 3, DMA channel 16 is given as the next supported resource combination. DMA channel 16 is unused so Device A now owns it. In sum, Device A has moved from IRQ line 1, DMA channel 12 to IRQ line 3, DMA channel 12, then to IRQ line 3, DMA channel 16. These new values are saved as Device A's potential configuration (eliminating the previous values). When Device A's resources are checked, Device A will report its potential configuration. Since Device A successfully moved off of DMA channel 12, its configuring flag is reset in state 836 and a success code is passed back to the calling device, Device C, which is now free to use DMA channel 12.

The device resources at this stage appear as follows. Note that Device A has moved twice, Device B was undisturbed, and Device C is configured with a conflict-free resource combination in state 838.

| | Device A DMA | | |
|---|---|---|---|
| IRQ | 12 | 14 | 16 |
| 1 | $X_1$ | | |
| 2 | | | |
| 3 | | $X_2$ | $X_3$ |
| 4 | | | |

| | Device B DMA | | | |
|---|---|---|---|---|
| IRQ | 12 | 14 | 16 | 18 |
| 1 | | | | |
| 2 | | $X_1$ | | |

| | Device C[R] DMA | |
|---|---|---|
| IRQ | 12 | 14 |
| 1 | $X_1$ | |
| 2 | | | line 1, DMA channel 12, will update its pattern with IRQ line 1, DMA channel 12 and set its exclude mask to indicate its desire to change the IRQ line. Device C now looks for a configuration that is NOT IRQ line 1, and DMA channel 12 in an attempt to move off its current IRQ line resource. However, no attempt is made to move the DMA channel resource since it does not yet conflict.

The next possible configuration matching the pattern is retrieved. It is IRQ line 2, DMA channel 12 which conflicts with Device B. Since Device A is not in resolve mode (it tries to fit in the system without disturbing other devices) it requests the next matching resource. As none is available for Device C, it now enters Resolve Mode. It has already tried (and failed) to configure without asking any other devices to move off of their current resources. Device C will now go through all of its configurations again in the same manner, this time asking the conflicting devices to move.

Device C retrieves its first resource combination that does not use IRQ line 1, the resource requested to be freed. IRQ line 2, DMA channel 12 is retrieved. IRQ line 2 does conflict with Device B which owns IRQ line 2. Device C (which is in Resolve Mode) now requests that Device B move off of IRQ line 2.

Transitioning from state 842 to state 852, Device B is now the focus of the system. If it can move, Device C may use IRQ line 2. If it fails to move, Device C must use another IRQ line. In attempting to move, Device B will repeat the process of fitting into the system as if it were just added with the exception that it will avoid IRQ line 2. Device B, which is currently configured to use IRQ line 2, DMA channel 14 will update its pattern with IRQ line 2, DMA channel 12 and set as exclude mask to indicate its desire to change the IRQ line. Device B now looks for a configuration that is NOT IRQ line 2, and DMA channel 14 in an attempt to move off its IRQ line resource. The next possible configuration matching the pattern is retrieved: IRQ line 1, DMA channel 12 which conflicts with another device, Device B. Since Device B is not (yet) in resolve mode (it tries to fit in the system without disturbing other devices) it requests the next matching resource. As none are available for Device B; the supported IRQ lines have been exhausted.

Device B now enters Resolve mode. It has already tried (and failed) to configure without asking any other devices to move off of their current resources. Device B will now go through all of its configurations again in the same manner, this time asking the conflicting devices to move. Now Device B again gets its first resource combination that does not use IRQ line 2, the resource requested to be freed. IRQ line 1, DMA channel 12 is retrieved. IRQ line 1 does conflict with other devices: Device D is trying to configure with IRQ line 1. Device B (which is in Resolve mode) now requests that Device D (which is flagged as being re-configured) move off of IRQ line 1.

Because Device D is already tagged as processing a re-configuration, it cannot move. A failure code is immediately returned to the calling device, Device B, to tell Device B that it cannot use IRQ line 1. In turn, Device B retrieves the next combination that matches his pattern of NOT IRQ line 2, DMA channel 12. As no more valid resource combinations are available, Device B cannot move off of IRQ line 2. A failure code is immediately returned to the calling device, Device C, to notify Device C that it cannot use IRQ line 2.

In turn, Device C retrieves the next combination that matches the updated pattern of NOT IRQ line 2, DMA channel 12. However, no more valid resource combinations are available. Thus, Device B could not move off of IRQ line 1, the original resource it was asked to free up. A failure code is immediately returned to the calling device, Device D. Device D, the newly added device, is once again the focus of the CRE. A quick recap of events after the addition of Device D up to this point is as follows:

1. No conflict-free resource combinations were found.
2. Attempting to obtain IRQ line 1 failed (No combination of moving devices would free up IRQ line 1).

In this example, it should be apparent that the limiting factors in step 2 listed above was the IRQ resource. Specifically, Devices B and C cannot both move so that either IRQ line 1 or IRQ line 2 is freed. When Device D tries the next possible resource combination (IRQ line 2, DMA channel 12), the same situation occurs. Those steps are outlined for brevity as follows:

---

Device D asks Device B to move off IRQ line 2 (Device C's current IRQ line).
    Device B is flagged as processing a re-configuration.
    Device B cannot use IRQ line 1.
    Device B enters Resolve mode.
    Device B asks Device C to move off IRQ line 1 (Device B's current IRQ line).
        Device C is flagged as processing a re-configuration.
        Device C cannot use IRQ 2.
        Device C enters Resolve mode.
        Device C asks Device D to move off IRQ 2 (Device C's current IRQ).
            Device D cannot move (being reconfigured).
        Device C cannot use IRQ 2.
        Device C cannot move.
    Device B cannot use IRQ 1.
    Device B cannot move.
Device D cannot use IRQ 2.

---

The next possible resource combination is found for Device D that matches the pattern NOT IRQ line 2, ANY DMA channel. That resource combination is IRQ line 3, DMA channel 12. IRQ line 3 conflicts with Device A. Since Device D is still in Resolve mode, it will ask Device A to free its IRQ line resource. Device A is now the focus of the system. If it can move, Device D may use IRQ line 3. If it fails to move, Device D must use another IRQ line. In attempting to move, Device A will repeat the process of fitting into the system as if it were just added with the exception that it will avoid IRQ line 3.

Device A, which is currently configured to use IRQ line 3, DMA channel 16, will update its pattern with those resources and set its exclude mask to indicate its desire to change the IRQ line. Device A now looks for a configuration that is NOT IRQ line 3, and DMA channel 16 in an attempt to move off its IRQ line resource. No attempt is made to move the DMA resource since it does not yet conflict. The next possible configuration matching the pattern is retrieved. It is IRQ line 1, DMA channel 16. Device A's attempt to move will fail in the same way that Device D failed to get IRQ line 1. Device A's next possible resource combination (IRQ line 2, DMA channel 16) will fail in the same manner that Device D failed to get IRQ line 2. The steps the CRE takes to discover this are outlined below for the sake of brevity:

---

Device A asks Device C to move off IRQ 1 (Device C's current IRQ).
    Device C is flagged as processing a re configuration.
    Device C cannot use IRQ 2.
    Device C enters Resolve mode.
    Device C asks Device B to move off IRQ 2 (Device B's current IRQ).
        Device B is flagged as processing a re-configuration.
        Device B cannot use IRQ 1.
        Device B enters Resolve mode.

-continued

Device B asks Device A to move off IRQ 1 (Device C's
current IRQ).
    Device A cannot move (being reconfigured).
        Device B cannot use IRQ 1.
Device B cannot move.
Device C cannot use IRQ 2.
Device C cannot move.
Device A cannot use IRQ 1.
Device A attempts to reconfigure to IRQ line 2, DMA channel 16
    Device A asks Device B to move off IRQ 2 (Device C's current
IRQ).
        Device B is flagged as processing a re configuration.
        Device B cannot use IRQ 1.
        Device B enters Resolve mode.
        Device B asks Device C to move off IRQ 1 (Device B's
current IRQ).
            Device C is flagged as processing a to configuration.
            Device C cannot use IRQ 2. 121.
            Device C enters Resolve mode.
            Device C asks Device A to move off IRQ 2 (Device C's
current IRQ).
                Device A cannot move (being reconfigured).
            Device C cannot use IRQ 2.
            Device C cannot move.
        Device B cannot use IRQ 1.
        Device B cannot move.
    Device A cannot use IRQ 2.

Device A will update its pattern with IRQ 2, DMA channel 16 and set its exclude mask to indicate its desire to change the IRQ. Device A now looks for a configuration that is NOT IRQ 2, and DMA channel 16 in an attempt to move the single DMA channel resource. The next possible configuration matching the pattern is retrieved. It is IRQ 4, DMA channel 14. Note that IRQ 3 was skipped over since that is the target resource to free up. There is no conflict with another device (IRQ 4 is unused) so Device A now owns it.

In sum, Device A has moved from IRQ 3, DMA channel 16 to IRQ 4, DMA channel 16. These new values are saved as Device A's potential configuration. When Device A's resources are checked, Device A will report its potential configuration. Since Device A successfully moved off of IRQ 3, its to configuring flag is reset and a success code is passed back to the calling device, Device D, which is now free to use IRQ 3 and does so in state 854.

The device resources at this stage appear as follows. Note that Device A has a potential configuration of IRQ 4, DMA channel 16, Devices B and C were undisturbed, and Device D is still searching for with a conflict-free resource combination but now owns.

| | Device A DMA | | |
|---|---|---|---|
| IRQ | 12 | 14 | 16 |
| 1 | $X_1$ | | |
| 2 | | | |
| 3 | $X_2$ | | $X_3$ |
| 4 | | | $X_4$ |

| | Device B DMA | | |
|---|---|---|---|
| IRQ | 12 | 14 | 16 | 18 |
| 1 | | | | |
| 2 | $X_1$ | | | |

| | Device C DMA | |
|---|---|---|
| IRQ | 12 | 14 |
| 1 | $X_1$ | |
| 2 | | |

| | Device D [R] DMA |
|---|---|
| IRQ | 12 |
| 1 | |
| 2 | |
| 3 | |

Device D continues its configuration process. The pattern is updated with IRQ 3 and a DMA wild card. The next possible configuration to consider is IRQ line3, DMA channel 12. That DMA channel value conflicts with Device C. Since Device D is in Resolve mode, it asks Device C to move off of DMA channel 12 in state 856. The focus now turns to Device C which will attempt to find the next conflict-free resource combination.

After setting the reconfiguration flag in step 856, Device C updates its pattern and exclude mask with its current configuration and; it is requesting a resource combination that is IRQ line 1, NOT DMA channel 12. The device receives the combination IRQ line 1, DMA channel 14. This conflicts with Device B. Since Device C is not (yet) in Resolve mode, it requests the next combination. None are available, so Device C enters Resolve mode.

Once again, Device C's pattern and exclude masks are set to indicate IRQ line 1, NOT DMA channel 12. Again, IRQ line 1, DMA channel 14 is obtained. The conflicting device, B, is asked to move Device B now transitions from state 842 to state 858. The focus now turns to Device B which will attempt to find a conflict-free resource combination before going into Resolve mode. Device B will update its pattern to its current configuration (IRQ line 2, DMA channel 14) and its exclude mask (to indicate that the DMA channel is to be freed).

Device B is then flagged as processing a re-configuration. The next available combination obtained from IRQ line 2, NOT DMA channel 14 is IRQ line2, DMA channel 12. That DMA channel value conflicts (with Device D's potential configuration) so the next available combination obtained is IRQ line 2, DMA channel 16. Note that Device B's DMA channel 14 choice was skipped because that is the original DMA channel value that Device B was asked to free up. The DMA channel 16 value conflicts with another device (A). The next available combination obtained for Device B is IRQ line 2, DMA channel 18. There is no conflict with that DMA channel resource. Device B then sets its potential configuration to IRQ line 2, DMA channel 18 and passes back a success code to the calling device (Device C) in state 858. This allows Device C to use IRQ line 14. The summary of the sub-sequence is shown below:

Device B cannot use DMA 12.
Device B cannot use DMA 16.
Device B now "owns" DMA 18.
Device B is flagged as not processing a configuration.
Device C now "owns" IRQ 14.
Device C is flagged as not processing a re-configuration.
Since Device C is done re-configuring, it passes a success code back to the device that called it (Device D). Since Device C was able to move off of DMA 12, the calling device, D, is able to use that resource.

At this stage, Device D is flagged as not processing a re-configuration and Device D has been successfully added to the system. The device resources at this stage appear as follows.

| | Device A DMA | | |
|---|---|---|---|
| IRQ | 12 | 14 | 16 |
| 1 | $X_1$ | | |
| 2 | | | |
| 3 | $X_2$ | | $X_3$ |
| 4 | | | $X_4$ |

| | Device B DMA | | | |
|---|---|---|---|---|
| IRQ | 12 | 14 | 16 | 18 |
| 1 | | | | |
| 2 | | $X_1$ | | $X_2$ |

| | Device C DMA | |
|---|---|---|
| IRQ | 12 | 14 |
| 1 | $X_1$ | $X_2$ |
| 2 | | |

| | Device D [R] DMA |
|---|---|
| IRQ | 12 |
| 1 | |
| 2 | |
| 3 | $X_1$ |

Note that Device B has moved, Device C has moved and Device D is configured with a conflict-free resource combination.

In summary, to add Devices A–D, the CRE goes through the following steps:

DEVICE A IS ADDED TO THE SYSTEM
    Device A is flagged as processing a re-configuration.
    Device A "owns" IRQ 1.
    Device A "owns" DMA 12.
    Device A is flagged as not processing a configuration.

DEVICE B IS ADDED TO THE SYSTEM
    Device B is flagged as processing a re-configuration.
    Device B cannot use IRQ 1.
    Device B "owns" IRQ 2.
    Device B "owns" DMA 14.
    Device B is flagged as not processing a configuration.

DEVICE C IS ADDED TO THE SYSTEM

Device C is flagged as processing a configuration.
Device C cannot use IRQ 1.
Device C cannot use IRQ 2.
Device C enters Resolve mode.
Device C asks Device A to move off IRQ 1 (Device A's current IRQ).
    Device A is flagged as not processing a re-configuration.
    Device A "owns" IRQ 1.
    Device A is flagged as not processing a configuration.
Device C "owns" IRQ 1.
Device A is flagged as not processing a configuration.

Device C asks Device A to move off DMA 12 1 (Device A's potential DMA).
    Device A is flagged as processing a re-configuration.
    Device A "owns" DMA 16.
    Device A is flagged as not processing a configuration.
Device C "owns" DMA 12.
Device C is flagged as not processing a configuration.

DEVICE D IS ADDED TO THE SYSTEM
    Device D is flagged as processing a configuration.
    Device D cannot use IRQ 1.
    Device D cannot use IRQ 2.
    Device D cannot use IRQ 3.
    Device C enters Resolve mode.

DEVICE D TRIES TO OBTAIN IRQ 1

Device D asks Device C to move off IRQ 1 (Device C's current IRQ).
    Device C is flagged as not processing a re-configuration.
    Device C cannot use IRQ 2.
    Device C enters resolve mode.
    Device C asks Device B to move off IRQ 2 (Device B's current IRQ).
        Device B is flagged as processing a re-configuration.
        Device B cannot use IRQ 1.
        Device B enters Resolve mode.
        Device B asks Device D to move off IRQ 1 (Device C's current IRQ).
            Device D cannot move (being reconfigured).
        Device B cannot use IRQ 1.
        Device B cannot move.
    Device C cannot use IRQ 2.
    Device C cannot move.
Device D cannot use IRQ 1.

DEVICE D TRIES TO OBTAIN IRQ 2

Device D asks Device B to move off IRQ 2 (Device C's current IRQ).
    Device B is flagged as not processing a re-configuration.
    Device B cannot use IRQ 1.
    Device B enters Resolve mode.
    Device B asks Device C to move off IRQ 1 (Device B's current IRQ).
        Device C is flagged as processing a re-configuration.
        Device C cannot use IRQ 2.
        Device C enters Resolve mode.
        Device C asks Device D to move off IRQ 2 (Device C's current IRQ.)
            Device D cannot move (being reconfigured).
        Device C cannot use IRQ 2.
        Device C cannot move.
    Device B cannot use IRQ 1.
    Device B cannot move.
Device D cannot use IRQ 2.

DEVICE D TRIES TO OBTAIN IRQ 3

Device D asks Device A to move off IRQ 3 (Device A's current IRQ).
Device A attempts to reconfigure to IRQ 1, DMA 16
    Device A is flagged as processing a reconfiguration.
    Device A asks Device C to move off IRQ 1 (Device C's current IRQ).
        Device C is flagged as processing a re configuration.
        Device C cannot use IRQ 2.
        Device C enters Resolve mode.
        Device C asks Device B to move off IRQ 2 (Device B's current IRQ).
            Device B is flagged as processing a re-configuration.

-continued

```
            Device B cannot use IRQ 1.
            Device B enters Resolve mode.
            Device B asks Device A to move off IRQ 1 (Device
              C's current IRQ).
                Device A cannot move (being reconfigured).
                Device B cannot use IRQ 1.
                Device B cannot move.
            Device C cannot use IRQ 2.
            Device C cannot move.
        Device A cannot use IRQ 1.
    Device A attempts to reconfigure to IRQ 2, DMA 16
        Device A asks Device B to move off IRQ 2 (Device C's
          current IRQ).
            Device B is flagged as processing a re configuration.
            Device B cannot use IRQ 1.
            Device B enters Resolve mode.
            Device B asks Device C to move off IRQ 1 (Device B's
              current IRQ).
                Device C is flagged as processing a re-configuration.
                Device C cannot use IRQ 2.
                Device C enters Resolve mode.
                Device C asks Device A to move off IRQ 2 (Device
                  C's current IRQ).
                    Device A cannot move (being reconfigured).
                    Device C cannot use IRQ 2.
                    Device C cannot move.
                Device B cannot use IRQ 1.
                Device B cannot move.
        Device A cannot use IRQ 2.
    Device A attempts to reconfigure to IRQ 4, DMA 16
        Device A "owns" IRQ 4.
        Device A is flagged as not processing a configuration.
    Device D Owns IRQ 3.
```

DEVICE D TRIES TO OBTAIN DMA 12

```
    Device D asks Device C to move off DMA 12 (Device C's current
      DMA).
        Device C is flagged as processing a re configuration.
        Device C cannot use DMA 14.
        Device C enters Resolve mode.
        Device C asks Device B to move off DMA 14 (Device B's
          current DMA).
            Device B is flagged as processing a re configuration.
            Device B cannot use DMA 12.
            Device B cannot use DMA 16.
            Device B "owns" DMA 18.
            Device B is flagged as not processing a configuration.
        Device C "owns" IRQ 14.
        Device C is flagged as not processing a re-configuration.
        Device D "owns" DMA 12.
    Device D is flagged as not processing a re-configuration.
```

Turning to FIGS. 20A–20F, illustrated is the reduction of the system to solve as one conflict resolution aspect of the invention. Referring above to the portion of the addition of Device D to the system where Device D attempted to obtain IRQ line 3, it will be appreciated that each object representing a device becomes a part of a smaller and smaller system to be "solved".

Figure 20A:
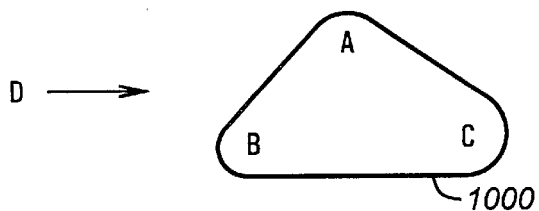
FIGS. 20A–20F are diagrams illustrating communications among virtual devices to reconfigure themselves using the Move-Me procedure in accordance with the present invention.
Figure 20B:
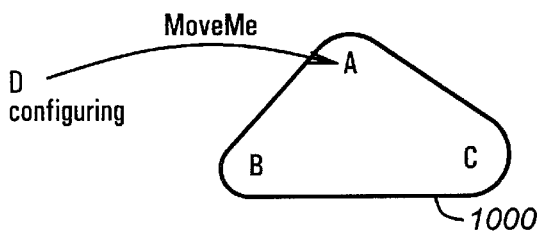
Figure 20C:
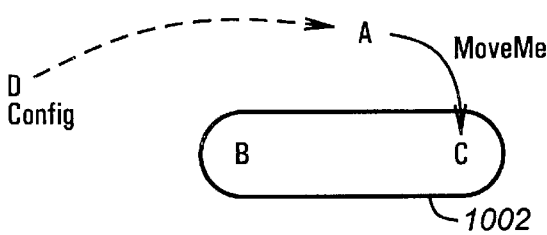

Referring to FIG. 20A, Device D has been added to an original system 1000 which contains Devices A, B and C. In the portion discussed above where Device D attempts to obtain IRQ line 3, FIG. 20B illustrates how Device D, which is configuring, issues a Move-Me command to Device A. Proceeding to FIG. 20C, it is seen that Device A, now reconfiguring, in turn issues a Move-Me command to Device C. At this point, only Devices B and C are no longer configuring or reconfiguring, so they form a subset 1002 of the original system 1000.

Figure 20D:
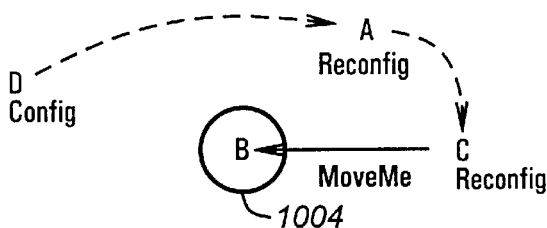

Proceeding to FIG. 20D, it is seen that Device C, now reconfiguring, issues a Move-Me command to Device B. At this point, Device B is the only device remaining which is not configuring or reconfiguring, so it forms a further subset of the original system 1000, now a subset 1004.

Figure 20E:
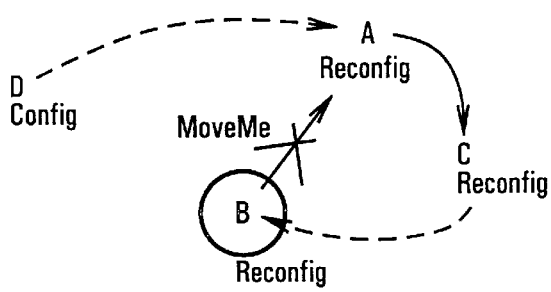

Proceeding to FIG. 20E, Device B requests that Device A move through a Move-Me command, but in this case, Device A is reconfiguring, so the Move-Me command fails. Specifically, a device within a system that is being resolved cannot ask devices outside of that system to move.

Figure 20F:
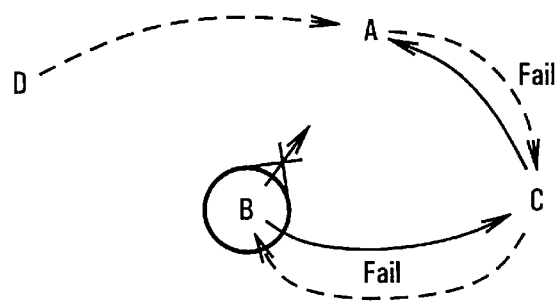

Turning to FIG. 20F, B issues a failure response to Device C which in turn issues a failure to Device A. At this point, A then attempts to reconfigure to the next available configuration determinants, as is deterministically chosen as discussed above. This sequence illustrates how in attempting to resolve conflicts, a smaller and smaller system of objects representing the devices attempts to resolve. Because these objects are encapsulated, they do not care whether other devices have already moved or not—they have simple rules regarding whether they attempt to fit or they attempt to have other devices moved.

In this manner, the present invention resolves conflict by attempting to fit the new device into the system resources and if a non-conflicting configuration is available from the acceptable configurations for the new device, setting the configuration of the new device to the non-conflicting configuration. However, in the event that a non-conflicting configuration cannot be located, the apparatus requests one of the existing devices to select another configuration from its acceptable configurations until a non-conflicting configuration is available for said first device. If the apparatus cannot adjust the configuration of existing devices to fit the new device, a failure occurs. Otherwise, the devices communicate amongst themselves to automatically arrive at an acceptable configuration for all devices.

In this manner, the present invention resolves conflicts in the computer system with one or more devices and one or more system resources and where each of the devices has an existing configuration and one or more acceptable configurations. The devices are represented as one or more objects corresponding to each of the devices. Each object has a move procedure and a fit procedure. The move procedure requests objects representative of other devices to move from their existing configurations, while the fit procedure attempts to fit an acceptable configuration of the object into the system resources. The objects are linked together using a tree structure. When a new or unconfigured device is to be added to the system, the apparatus provides a new or unconfigured object representative of the new or unconfigured device. The new or unconfigured object calls the fit procedure to attempt to fit itself into said system resources and, if a non-conflicting configuration is available from the acceptable configurations for the new or unconfigured device, to set the configuration of the new or unconfigured device to the non-conflicting configuration. Otherwise, the object communicates with the remaining objects to request remaining devices to select another configuration from their acceptable configurations until a non-conflicting configuration is available for said first device.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for resolving conflicts in a computer system with one or more devices and one or more system resources, wherein each of said devices has an existing configuration and one or more acceptable configurations, comprising:

providing one or more objects corresponding to each of said devices, each of said object having a move procedure and a fit procedure, said move procedure being adapted to request objects representative of other devices to move from their existing configurations, said fit procedure being adapted to fit one acceptable configuration of the object into said system resources; and providing a first object representative of a first device to be added to said computer system, said first object being adapted to call said fit procedure to attempt to fit itself into said system resources and, if a non-conflicting configuration is available from said acceptable configurations for said first device, to set the configuration of said first device to said non-conflicting configuration, and otherwise said first object calling said move procedure to communicate with the remaining objects to request remaining devices to select another configuration from their acceptable configurations until a non-conflicting configuration is available for said first device.

2. The method of claim 1, further comprising the step of storing said objects in a network.

3. The method of claim 2, wherein said network is a tree network.

4. The method of claim 1, further comprising the step of recursively requesting one object to move at a time from its existing configuration in the event a conflicting configuration exists.

5. The method of claim 1, further comprising a step of locking the configuration of a current device before communicating with the remaining devices to request the remaining devices to select another configuration.

6. The method of claim 1, wherein each of said configurations includes an interrupt setting, a direct memory access setting, a memory range setting, or an input/output range setting.

7. The method of claim 1, wherein each of said device resides on an add-on card.

8. The method of claim 1, wherein each of said devices has one or more resources.

9. The method of claim 1, wherein each of said objects maintains its fitted configuration.

10. The method of claim 1, wherein said object flags itself as being unconfigured when the remaining objects cannot move.

11. The method of claim 1, wherein said first device recursively calls the fit procedure in configuring said first object for remaining system resources after a non-conflicting configuration is found for a system resource being checked.

12. A program storage device having a computer readable code embodied therein for resolving conflicts in a computer system with one or more devices and one or more system resources, wherein each of said devices has an existing configuration and one or more acceptable configurations, comprising:

a code for providing one or more objects corresponding to each of said devices, each of said object having a move procedure and a fit procedure, said move procedure being adapted to request objects representative of other devices to move from their existing configurations, said fit procedure being adapted to fit one acceptable configuration of the object into said system resources; and a code for providing a first object representative of a first device to be added to said computer system, said first object being adapted to call said fit procedure to attempt to fit itself into said system resources and, if a non-conflicting configuration is available from said acceptable configurations for said first device, to set the configuration of said first device to said non-conflicting configuration, and otherwise said first object calling said move procedure to communicate with the remaining objects to request remaining devices to select another configuration from their acceptable configurations until a non-conflicting configuration is available for said first device.

13. The program storage device of claim 12, further comprising a code for storing said objects in a network.

14. The program storage device of claim 13, wherein said network is a tree network.

15. The program storage device of claim 12, further comprising a code for recursively requesting one object to move at a time from its existing configuration in the event a conflicting configuration exists.

16. The program storage device of claim 12, further comprising a code for locking the configuration of a current device before communicating with the remaining devices to request the remaining devices to select another configuration.

17. The program storage device of claim 12, wherein each of said configurations includes an interrupt setting, a direct memory access setting, a memory range setting, or an input/output range setting.

18. The program storage device of claim 12, wherein each of said device resides on an add-on card.

19. The program storage device of claim 12, wherein each of said devices has one or more resources.

20. The program storage device of claim 12, wherein each of said objects maintains its fitted configuration.

21. The program storage device of claim 12, wherein said object flags itself as being unconfigured when the remaining objects cannot move.

22. The method of claim 12, wherein said first device recursively calls first the fit procedure in configuring said first object for remaining system resources after a non-conflicting configuration is available for a system resource being checked.

23. A computer system having resource conflict resolution capability, said computer system having one or more system resources, comprising:

a processor;

a first device coupled to said processor;

one or more second devices coupled to said processor; and a program storage device having a computer readable code embodied therein for resolving conflicts in a computer system with one or more devices and one or more system resources, wherein each of said devices has an existing configuration and one or more acceptable configurations, including:

a code for providing one or more objects corresponding to each of said devices, each of said object having a move procedure and a fit procedure, said move procedure being adapted to request objects representative of other devices to move from their existing configurations, said fit procedure being adapted to fit one acceptable configuration of the object into said system resources; and a code for providing a first object representative of a first device to be added to said computer system, said first object being adapted to call said fit procedure to attempt to fit itself into said system resources and, if a non-conflicting configuration is available from said acceptable configurations for said first device, to set the configuration of said first device to said non-conflicting configuration, and otherwise said first object calling said move procedure to communicate with the remaining objects to request remaining devices to select another configuration from their acceptable configurations until a non-conflicting configuration is available for said first device.

24. The computer system of claim 23, further comprising a code for storing said objects in a network.

25. The computer system of claim 24, wherein said network is a tree network.

26. The computer system of claim 23, further comprising a code for recursively requesting one object to move at a time from its existing configuration in the event a conflicting configuration exists.

27. The computer system of claim 23, further comprising a code for locking the configuration of a current device before communicating with the remaining devices to request the remaining devices to select another configuration.

28. The computer system of claim 23, wherein each of said configurations includes an interrupt setting, a direct memory access setting, a memory range setting, or an input/output range setting.

29. The computer system of claim 23, wherein each of said device resides on an add-on card.

30. The computer system of claim 23, wherein each of said devices has one or more resources.

31. The computer system of claim 23, wherein each of said objects maintains its fitted configuration.

32. The computer system of claim 23, wherein said object flags itself as being unconfigured when the remaining objects cannot move.

33. The computer system of claim 23, wherein said first device recursively calls the fit procedure in configuring said first object for remaining system resources after a non-conflicting configuration is available for a system resource being checked.

* * * * *